United States Patent
Hammad

(10) Patent No.: US 8,453,226 B2
(45) Date of Patent: May 28, 2013

(54) TOKEN VALIDATION FOR ADVANCED AUTHORIZATION

(75) Inventor: Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/184,080

(22) Filed: Jul. 15, 2011

(65) Prior Publication Data

US 2012/0023567 A1    Jan. 26, 2012

Related U.S. Application Data

(60) Provisional application No. 61/365,737, filed on Jul. 19, 2010, provisional application No. 61/365,119, filed on Jul. 16, 2010.

(51) Int. Cl.
*H04L 29/06* (2006.01)

(52) U.S. Cl.
USPC .................................................. 726/9

(58) Field of Classification Search
USPC ..... 726/9, 4, 25; 235/375, 379, 380; 705/7.28
See application file for complete search history.

(56) References Cited

U.S. PATENT DOCUMENTS

| | | | |
|---|---|---|---|
| 7,003,495 B1 * | 2/2006 | Burger et al. | 705/50 |
| 7,096,192 B1 | 8/2006 | Pettitt | |
| 7,237,719 B2 | 7/2007 | Fruhauf | |
| 7,398,918 B1 | 7/2008 | Schwartz et al. | |
| 7,809,650 B2 | 10/2010 | Bruesewitz et al. | |
| 2006/0100957 A1 | 5/2006 | Buttler et al. | |
| 2009/0173782 A1 | 7/2009 | Muscato | |
| 2010/0010930 A1 * | 1/2010 | Allen et al. | 705/38 |
| 2010/0293382 A1 | 11/2010 | Hammad | |

FOREIGN PATENT DOCUMENTS

WO    WO 2009/134790    11/2009

OTHER PUBLICATIONS

U.S. Appl. No. 61/365,119, filed Jul. 16, 2010.
U.S. Appl. No. 61/365,737, filed Jul. 19, 2010.
U.S. Appl. No. 61/178,636, filed May 15, 2009.
U.S. Appl. No. 12/712,148, filed Feb. 24, 2010.
U.S. Appl. No. 10/863,813, filed Jun. 7, 2004.
U.S. Appl. No. 61/351,475, filed Jun. 4, 2010.

* cited by examiner

*Primary Examiner* — Ali Abyaneh
(74) *Attorney, Agent, or Firm* — Kilpatrick Townsend & Stockton LLP

(57) ABSTRACT

A server computer for implementing advanced authorization using token validation is provided. The server computer comprises a processor and a computer readable medium coupled to the processor comprising code executable by the processor for implementing a method. The method comprises receiving verification information that is based on a verification token associated with a client computer. The method further comprises receiving transaction information associated with a first transaction and receiving account information associated with a payment account used in the first transaction. A risk score associated with the first transaction is generated based on at least the verification information, the transaction information, and the account information.

18 Claims, 9 Drawing Sheets

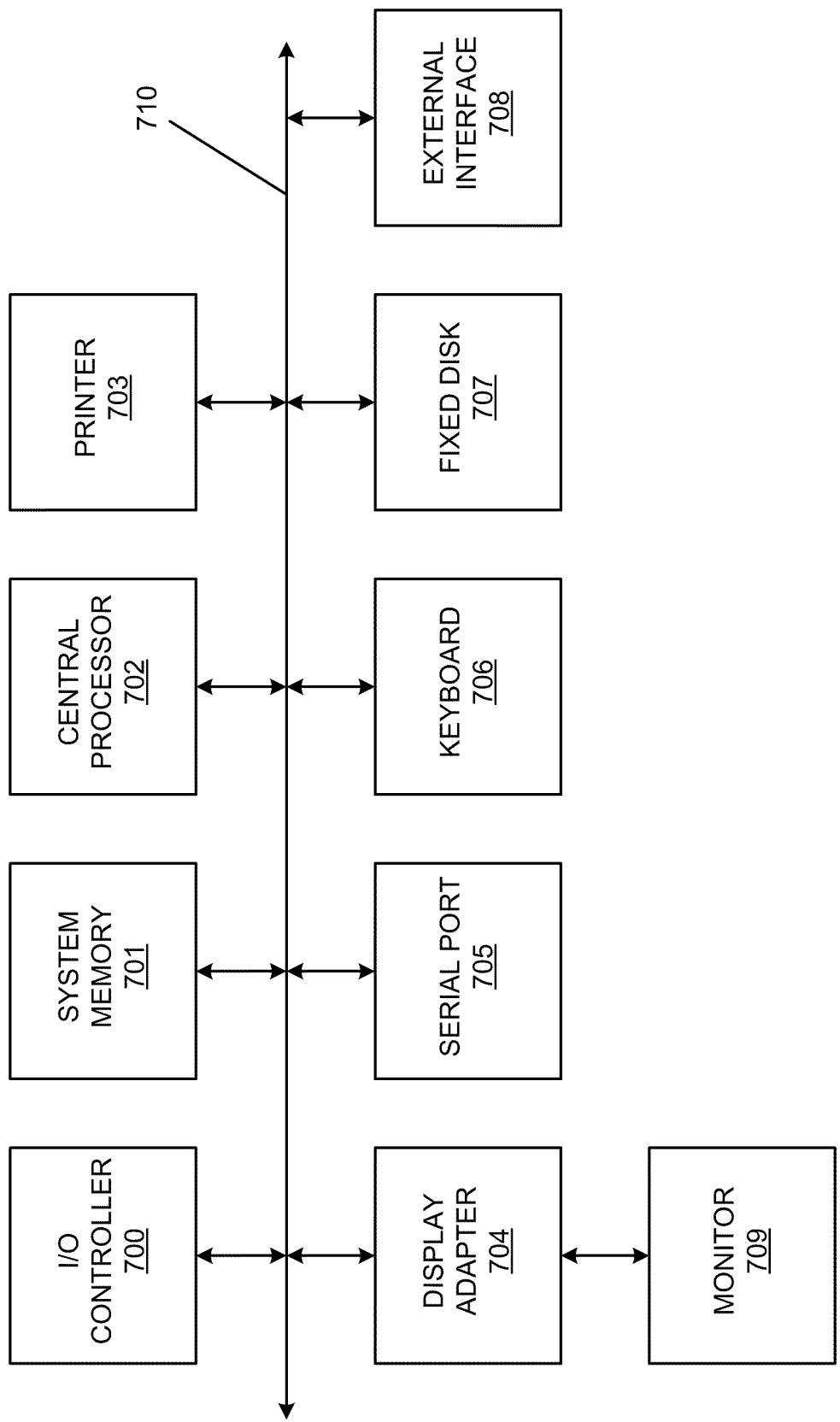

TOKEN VALIDATION FOR ADVANCED AUTHORIZATION

CROSS-REFERENCES TO RELATED APPLICATIONS

This application claims benefit under 35 U.S.C. §119(e) of U.S. provisional patent application No. 61/365,737, filed on Jul. 19, 2010, and U.S. provisional patent application No. 61/365,119, filed on Jul. 16, 2010, the entire disclosure of each these applications is incorporated herein by reference for all purposes.

BACKGROUND

There are different types of risks involved in authorizing use of a payment card. One well known type of risk is security risk, such as fraud. Security risk relates to illegitimate use of a payment card by an unauthorized person. Credit card fraud, for example, has continually been a persistent problem in the payment card industry. With the burgeoning growth of e-commerce and transactions conducted online, opportunities for payment card theft have become more readily available. As a result, online payment card fraud has also accordingly increased over the last few years. Existing industry solutions provide limited timely risk information to the transaction authorization process. Despite many prevention efforts, payment card fraud continues to account for annual losses in the range of hundreds of millions of dollars.

BRIEF SUMMARY

Embodiments disclosed herein provide for systems, methods, and/or apparatuses that utilize token validation for advanced authorization. The authorization systems and methods can be implemented using one or more computer apparatuses and/or databases. Although described below with reference to a server computer, embodiments are not so limited and may utilize the methods described herein in any suitable manner.

A server computer for implementing advanced authorization using token validation is provided. The server computer comprises a processor and a computer readable medium coupled to the processor comprising code executable by the processor for implementing a method. The method comprises receiving verification information that is based on a verification token associated with a client computer. The method further comprises receiving transaction information associated with a first transaction and receiving account information associated with a payment account used in the first transaction. A risk score associated with the first transaction is generated based on at least the verification information, the transaction information, and the account information.

In some embodiments, in the method as described above, the verification information is based on an interaction between the verification token and a portable device associated with the first transaction. In some embodiments, the interaction between the verification token and the portable device comprises short range communication, such as near field communications (e.g. contactless). In some embodiments, the interaction may comprise physical contact, such as through the use of a magnetic strip disposed on the portable device.

In some embodiments, in the method as described above, the server computer and the verification token or client computer establish a secure communication channel. The method as described above may further include receiving first information corresponding to the verification token using the secure communication channel. In some embodiments, the first information comprises at least one of: a token serial number, data encrypted with a unique key, and an IP address of the client computer or verification token.

In some embodiments, in the method as described above, the step of receiving verification information comprises receiving information indicating whether the verification token and/or account information is valid.

In some embodiments, in the method as described above, the step of receiving the verification information further includes receiving a first dynamic verification value corresponding to the portable device and receiving a second dynamic verification value associated with the first transaction. In some embodiments, the step of receiving the second dynamic verification value includes receiving the second dynamic verification value from the client computer or the verification token. In some embodiments, the step of receiving the second dynamic verification value associated with the first transaction includes receiving an authentication request message associated with the first transaction that comprises the second dynamic verification value. In some embodiments, the step of generating a risk score associated with the first transaction includes determining if the first dynamic verification value corresponds to the second dynamic verification value. In some embodiments, the step of receiving the verification information includes receiving information indicating whether the first dynamic verification value corresponds to the second dynamic verification value.

In some embodiments, in the method as described above, the step of receiving the verification information includes receiving information corresponding to whether the token passed at least one of a plurality of validation tests.

In some embodiments, the method as described above further includes sending the risk score to an issuer or a merchant. In some embodiments in which the risk score is sent to an issuer, the method as described above further includes receiving from the issuer an authorization response message corresponding to the first transaction. The authorization response message may be based at least in part on the risk score.

In some embodiments, in the method as described above, the transaction information may include at least one of a transaction amount, a velocity value, and a merchant identifier.

In some embodiments, in the method as described above, the account information may include at least one of an account number, an expiration date, a card verification value, and account profile information.

In some embodiments, the method as described above further includes receiving an authorization request message associated with a transaction. The authorization request message may include the transaction related information.

In some embodiments, the method as described above further includes receiving a request for a first dynamic verification value from a user via the verification token coupled to a client computer. The first dynamic verification value is generated in response to the request sent by the user or the token. The generated first dynamic verification value is sent to the user making the request. In some embodiments, the step of sending the first dynamic verification value to the user includes sending the generated first dynamic verification value to the verification token associated with the user. In some embodiments, the step of sending the first dynamic verification value to the user comprises the use of a secured channel.

In some embodiments, in the method as described above, the risk score is generated at either a payment processing network or at a merchant processor.

In some embodiments, a server computer is provided that includes a processor; and a computer readable medium coupled to the processor. The computer readable medium comprises code executable by the processor for implementing a method that includes receiving a request for a dynamic verification value from a user via a verification token coupled to a client computer; generating a dynamic verification value in response to the request; sending the generated verification value to the verification token associated with the user making the request; and sending the generated verification value to an authorization system. The authorization system uses the generated verification value as further criteria in assessing the risk associated with a transaction conducted by the user using the generated verification value.

In some embodiments, a server computer is provided that comprises a processor; and a computer readable medium coupled to the processor, wherein the computer readable medium comprises code executable by the processor for implementing a method. The method includes receiving a request for a dynamic verification value from a user via a verification token coupled to a client computer; generating a dynamic verification value in response to the request; sending the generated verification value to the verification token associated with the user making the request; and sending the generated verification value to a merchant processor. The merchant processor uses the generated verification value as further criteria in assessing the risk associated with a transaction conducted by the user using the generated verification value.

In some embodiments, a client computer is provided. The client computer may comprise a processor; and a computer readable medium coupled to the processor that comprises code executable by the processor for implementing a method. The method may include the step of receiving account information from a portable device based on an interaction between the portable device and a verification token, sending the account information to a server computer; and sending information associated with the verification token to the server computer. The information associated with the verification token may be used by the server computer to validate the verification token. A risk score is generated corresponding to a first transaction based at least in part on the validation of the verification token.

In some embodiments, for the client computer as described above, the information associated with the verification token includes at least one of: a serial number of the verification token and an IP address associated with the client computer or the verification token.

In some embodiments, for the client computer as described above, the method further comprises the step of establishing a secure communication channel with the server computer based at least in part on the information associated with the verification token.

In some embodiments, for the client computer as described above the method further comprises the steps of receiving verification information from the server computer, wherein the verification information is generated by the server computer based on the validation of the verification token and sending the verification information to a merchant associated with the first transaction The verification information may be used to generate the risk score corresponding to the first transaction. In some embodiments, the verification information comprises a dynamic verification value.

As discussed herein, embodiments of systems, methods, and apparatuses are provided that utilize a verification token to generate information that may be used as an input to an authorization system and/or a merchant processor for determining whether a financial transaction should be authorized. Authorization systems may generate a risk score (which takes into account various factors related to a transaction) that indicates the likelihood that a financial transaction is fraudulent (e.g. the portable device or payment account information used in the transaction is stolen or otherwise fraudulent). This risk score may be used by a financial institution (such as an issuer of a payment account) or a merchant in determining whether to approve the transaction. A verification token (which may be a secure device that may interact with a portable device) may be used in such financial transactions to provide additional information that may be utilized in generating the risk score for the particular transaction. For instance, the verification token may interact with a portable consumer device and send relevant information securely to an authorization system or similar entity. Because the validation token is a secured device, if it is validated, then a portable device that interacts with the verification token and a corresponding transaction are less likely to be fraudulent. Moreover, the verification token may be utilized as a secure way to send information that may be later utilized to authenticate a transaction and generate a risk score.

For example, if it is determined that the verification token is valid, this may provide additional evidence that the consumer involved in the transaction is the entity they are portraying themselves to be and/or is in possession of the portable device. This may be particularly useful in an e-commerce environment, whereby the consumer does not typically present a portable device to a merchant (such as the case for a point-of-sale (POS) terminal), but instead enters information corresponding to the portable device (or a payment account associated with the portable device) to complete the transaction. However, even if the verification token is authenticated, there is still a chance that the transaction could be fraudulent. Therefore, methods and apparatuses herein provide the advantage that the secure token may be used to convey information to an authorization system, which then uses this information as one of a plurality of inputs in generating a risk score. Moreover, systems and methods may utilize multiple validation tests performed with respect to the verification token. This may advantageously allow for additional factors to be considered by entities that authorize transactions, and thereby may provide greater adaptability, flexibility, and/or security in approving and conducting financial transactions, particularly in an ecommerce environment.

BRIEF DESCRIPTION OF THE DRAWINGS

FIG. 7 shows a block diagram of an exemplary computer apparatus.

DETAILED DESCRIPTION

Figure 1:
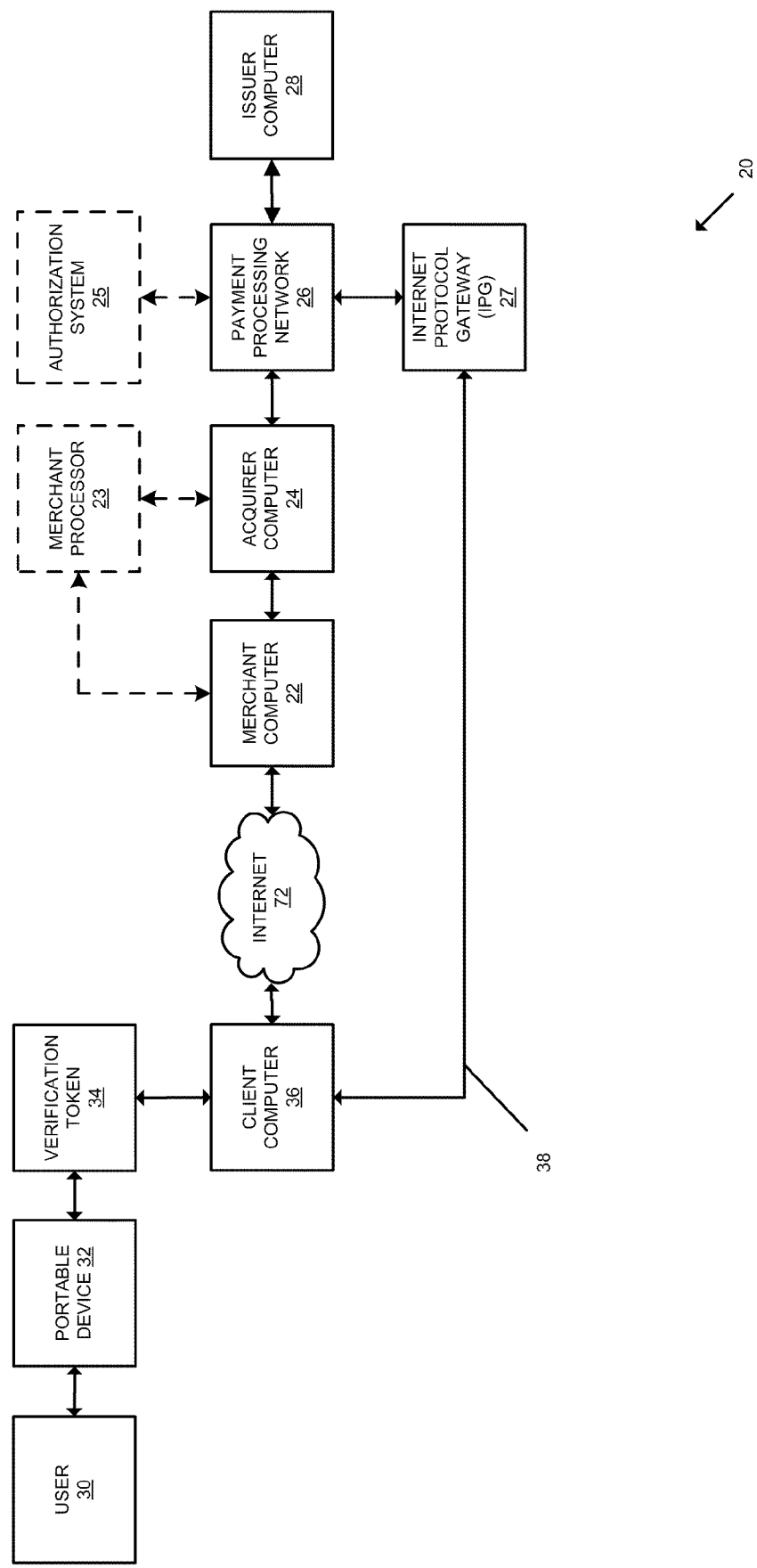
FIG. 1 shows a block diagram of a system according to an embodiment of the invention.

The following disclosure provides exemplary systems and methods for processing a purchase transaction, and in particular, determining the risk associated with a transaction based at least in part on information that is related to the validation of a verification token and/or portable device.

This application comprises subject matter that is related to U.S. App. Ser. No. 61/365,119, filed on Jul. 16, 2010, U.S. App. Ser. No. 61/178,636, filed on May 15, 2009, and U.S. application Ser. No. 12/712,148, filed on Feb. 24, 2010, all of which are herein incorporated by reference in their entirety for all purposes.

Before discussing specific embodiments of the invention, some descriptions of some specific terms are provided below.

As used herein, "account information" may include any suitable information associated with an account. Such information may be directly related to the account or may be derived from information related to the account. Examples of account information include a PAN (primary account number or "account number"), name, expiration date, CVV (card verification value), dCVV (dynamic card verification value), CVV2 (card verification value 2), and dCVV2 (dynamic card verification value 2). CVV2 is generally understood to be a static verification value associated with a portable payment device. dCVV2 is a dynamic verification value associated with a portable payment device. dCVV2 and CVV2 values are generally visible to a user (e.g., a consumer), whereas CVV and dCVV values are typically embedded in memory or authorization request message are not readily known to the user (although they are known to the issuer and payment processors). Account information may also comprise information about past transactions related to an account, a verification token, or an IP address, including known fraudulent entities.

As used herein, "transaction information" may include any suitable information related to a financial transaction, such as those conducted with a merchant. This may include a transaction amount, a merchant identifier for the merchant associated with the transaction, and the volume of the transaction or accumulation of previous transactions (for instance, if there are many similar purchases or many purchases within a short amount of time). It may also include the type of goods, the merchant location, and any other information that is related to the current transaction.

As used herein, "verification information" may include any information related to the validation of a verification token used or associated with a financial transaction. For instance, verification information may be information that indicates whether a token (or a portable device associated with the token) has been validated using any number of validity tests. Exemplary validity tests for a verification token are described in detail in U.S. patent application Ser. No. 12/712,148 to Hammad entitled "Verification of Portable Consumer Devices," which is hereby incorporated by reference in its entirety.

In some embodiments, the verification information may indicate the number of validation tests passed and/or failed by the verification token. The verification information may also comprise information that is generated after a verification token is validated (in some instances after an interaction with a portable device). For instance, the verification information could comprise a dynamic verification value (such as a dCVV2) that is generated and/or sent to a user interacting with the token after a verification token has been validated. The verification information may also comprise the results of post-authentication confirmation—such as the results of a comparison of a shared secret, encryption key, session key, dCCV2, or other information that may subsequently authenticate two entities over an unsecured network such as the internet. For instance, if a previously authenticated entity and an authorization system (such as an authorization system and/or merchant processor) establish a communication channel, there may be a mutual authentication (or one way authentication—typically of the previously authenticated entity—i.e. the user and/or verification token) by comparing the shared secret (e.g. a dynamic verification value). This may be done in a variety of ways, such as utilizing public/private key encryption, hashing algorithms, or simply sending the dynamic verification value via secured (or perhaps an unsecured) network. The results of the comparison (i.e. whether the user has a correct dynamic verification value that matches the one stored by the authentication entity) may thereby also comprise the "verification information."

As used herein, "risk score" may include an arbitrary designation or ranking that represents the risk associated that a transaction may be fraudulent. The risk score may be represented by a number (in any scale), a probability, or in any other relevant manner of conveying such information. The risk score may comprise an aggregation of information about a transaction, including transaction information, account information, and verification information as defined above. The risk score may be used by any authorizing entity (such as a merchant or an issuer) in determining whether to approve a transaction. The risk score may comprise and/or utilize both current transaction information and past transaction information, and may weight such information in any suitable manner.

As used herein, a "verification token" may refer to a device or component of a device (such as a software or hardware module) that may be used to authenticate a user or portable device—that is, for example, the verification token may be used to determine that a user is not misrepresenting his identity and/or that he has in his possession a portable device. An example of a verification token is provided in U.S. application Ser. No. 12/712,148 to Hammad, which is again hereby incorporated by reference in its entirety. An exemplary embodiment of a verification token is also described below with reference to FIGS. 5 and 6, and its exemplary functionality is described with reference to FIGS. 3 and 4. It should be understood, that the verification token may take any suitable form, including a USB stick or embedded module in a computer, and is generally configured to authenticate a user and/or portable device. In some embodiments, the verification token may "interact" with a portable device, which means that the verification token may receive information from the portable device in any suitable manner. For instance, in some embodiments, the verification token may interact with a portable device using short range communication (such as near field communication including RFID or Bluetooth®) or through physical interaction such as through the use of a magnetic strip.

As used herein, "authorization system" may refer to a system, a device, or component of a device that may utilize information to determine the probability or likelihood that an transaction is fraudulent. Although the term "merchant processor" may be referred to separately from an "authorization system" in portions of this disclosure, in some embodiments they may comprise one and the same system or systems that may perform substantially the same functionality, but in relation to different components of the system (e.g. providing information to a merchant or an issuer). Authorization systems may quantify the probabilities or likelihood of a fraudulent transaction by generating a "risk score." In some embodiments the authorization system may approve or reject a transaction. An exemplary embodiment of an authorization system is provided in U.S. Pat. No. 7,809,650 to Bruesewitz et al. entitled "Method and System for Providing Risk Information in Connection with Transaction Processing," which is hereby incorporated by reference in its entirety. It should be understood that embodiments are not so limited, and additional exemplary embodiments of an authorization system are described below with reference to FIG. 2.

An "authorization request message" may be a message that includes an issuer account identifier. The issuer account identifier may be a payment card account identifier associated with a payment card. The authorization request message may request that an issuer of the payment card authorize a transaction. An authorization request message according to an embodiment of the invention may comply with ISO 8583, which is a standard for systems that exchange electronic transactions made by cardholders using payment cards. An authorization request message may comprise data elements including, in addition to the account identifier, a service code, a CVV (card verification value), and an expiration date. An authorization request message may also comprise some or all of the information associated with a transaction, such as the "account information," "transaction information," and "verification information" defined above.

An "authorization response message" may be an issuing financial institution's electronic message reply to an authorization request, which may include one or more of the following status indicators: Approval—transaction was approved; Decline—transaction was not approved; or Call Center—response pending more information, merchant must call the toll-free authorization phone number. It may also include an authorization code, which may be a code that a credit card issuing bank returns in an electronic message to the merchant's POS equipment that indicates approval of the transaction. The code serves as proof of authorization.

A "communications channel" may include any suitable path for communication between two or more entities. Suitable communications channels may be present directly between two entities such as a client computer and a gateway server, or may include a number of different entities. Any suitable communications protocols may be used for communications channels according to embodiments of the invention.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

Embodiments disclosed herein provide for systems, methods, and/or apparatuses that utilize token validation for advanced authorization. The authorization systems and methods can be implemented using one or more computer apparatus and/or database. Although described below with reference to a server computer, embodiments are not so limited and may utilize the methods described herein in any suitable system or device.

A server computer for implementing advanced authorization for financial transactions using token validation is provided. The server computer comprises a processor and a computer readable medium coupled to the processor comprising code executable by the processor for implementing a method. The method comprises receiving verification information that is based on a verification token associated with a client computer. As described above, the verification information may comprise any information that is related to the validity or authentication of the verification token. The inventors have recognized that the use of such information can improve the ability to detect fraudulent transactions (or reduce the number of false positives associated with non-fraudulent transactions). As noted above, current systems utilize only a limited amount of information to identify fraudulent transactions, particularly in e-commerce embodiments. By utilizing verification information associated with a verification token, authorizing entities (such as issuers and merchants) may have additional information and/or more accurate assessments of the risks for such transactions.

The method described above further comprises receiving transaction information associated with a first transaction and receiving account information associated with a payment account used in the first transaction. This information may be received in any suitable manner, including as a component of an authorization request message related to a financial transaction. A risk score associated with the first transaction is generated based on at least the verification information, the transaction information, and the account information. As described above, the risk score can be a representation that allows authorization decisions to be made by merchants, issuers or any other entity. For instance, a risk score could indicate that there is ninety percent chance that the transaction is fraudulent. Such a risk score could result when, for example, the verification token could not be validated, the IP address associated with a client computer had been used in previous fraudulent transactions, and the financial transaction involves the purchase of an unusual amount of a particular product. However, any combination of information and weighting of that information may be used. In contrast, had the verification token been validated, the risk score generated may have indicated only a ten percent chance of fraud, even though the transaction was for an unusual amount of a product and the IP address of the client computer had been used in previous fraudulent transactions, because of the use of the verification token (while not assuring with absolute certainty that there is no fraud), may provide strong evidence that the user was at least is in possession of a valid portable device (such as a credit card).

As noted above, the risk score may be determined by utilizing a combination of factors that are assigned different weighted values given the likelihood that transactions comprising those factors are fraudulent. For example and for illustration purposes only, an exemplary authorization system may determine the risk score of a transaction based on five factors: (1) whether the verification information indicates that the verification token is validated; (2) the transaction amount; (3) whether the account has been involved in any fraudulent transactions; (4) the volume of action relative to typical use (e.g. if the portable device is typically used for one purchase a week, if it is later used for 100 purchases in a one hour span, this may indicate fraud); and (5) the merchant identifier (a particular merchant and/or the goods sold may be the target of fraudulent transactions). Provided below is a table showing three hypothetical and exemplary transactions, the relative weights for each of the factors, and the total risk score (given as a percentage) based on exemplary weighting parameters. Again, this is for illustration purposes only and may be simplified in comparisons to actual implementations.

TABLE 1

Exemplary Illustrative Risk Score Determination

| | (1) Token Valid? | (2) Transaction Amount | (3) Account Has Past Fraud | (4) Velocity | (5) Merchant Identifier | Risk Score |
|---|---|---|---|---|---|---|
| First Transaction | Valid (−50%) | Over $500 (+10%) | YES (+35%) | Increase by 30% (+15%) | High Risk Merchant (+10%) | 20% |
| Second Transaction | Invalid (+25%) | Less than $500 (0%) | NO (0%) | Increase by 10% (0%) | Low Risk (0%) | 25% |
| Third Transaction | No Token Available (0%) | Over $500 (+10%) | YES (+35%) | Increase by 25% (+10%) | Low Risk (0%) | 55% |

As shown in the exemplary risk score determination in Table 1, a transaction having verification information that indicates that a verification token has been validated may be used to reduce the likelihood of fraud by 50%, while a transaction with information indicating that a verification token was not valid may be used to increase the chance of fraud by 25%. Again, these numbers are for illustration purposes only. As illustrated, despite the fact that the first transaction had higher risk factors associated with four of the five categories in comparison to the second and third transactions, the risk score of that transaction was the lowest because the verification information indicated that the verification token had been validated. This may indicate that for the first transaction, the user had the portable device that interacted with a valid verification token. Embodiments may thereby provide the benefit of decreasing false positives of fraudulent transactions that have objective factors that, taken alone, could be associated with a fraudulent transaction. In contrast, in the second transaction, the token was found invalid, increasing the chance of fraud by 25%. Finally, some embodiments may include users that do not possess the verification token and therefore do not receive a score. As can be seen, the third transaction, despite having less risk associated with the risk factors 2-5, is considered a much higher risk than the first transaction because there is no offsetting factor in the form of token validation that could reduce this risk score. Exemplary methods are described below with reference to FIGS. 2 and 3.

It should be understood that the above illustrative calculations and determinations of the risk score for transactions, and other information such as the rules used for determining the weight to assign factors, the relationship between factors, the factors to consider, and any and all other processes and related information that may be used to develop the risk score for a transaction may be performed by one or more computer apparatuses and or databases. The hardware and software may be located in any suitable location, including any appropriate entity shown in FIG. 1, and discussed in detail below.

In some embodiments, in the method as described above in which a risk score is generated based at least in part on received verification information, transaction information, and account information, the verification information is based on an interaction between the verification token and a portable device associated with the first transaction. For instance, after the verification token interacts with a portable device so as to receive information stored therein, the verification token may establish communication with an IP Gateway to validate the verification token and/or the portable device through the use of one or more validation tests. If the tests are passed, then verification information indicating the completion of the tests may be sent to the token and/or to an authorization system so to determine a risk of fraud associated with a financial transaction using the portable device and/or verification token.

In some embodiments, when the verification information is based on an interaction between the verification token and the portable device, the interaction comprises short range communication, such as near field communications (e.g. contactless). This may be preferred in some embodiments, particularly when the verification token is embedded within a computer as it would not require any external input device to interface with a portable device. In some embodiments, the interaction may comprise physical contact, such as through the use of a magnetic strip disposed on the portable device. Thereby, for instance, embodiments may provide that to validate the verification token and the portable device, the verification token receives data that is stored on the portable device. The verification token may be a secured device (i.e. it is not accessible to the user) and may provide an indication that the user is in possession of the portable device used in the transaction.

In some embodiments, in the method as described above where a risk score is generated based at least in part on the received verification information, transaction information, and account information, the server computer and the verification token or client computer establish a secure communication channel. The channel may be established in any known manner, including the use of mutual authentication and a session key and establishment of an SSL session. However, any method of creating a secure channel may be used. By establishing a secure channel, sensitive information related to the portable device (such as account number, CVV values, expiration dates, etc.) may be securely transmitted between the two entities. Moreover, if a dynamic verification value is created, this may be transmitted to the user and utilized to validate future transactions. The verification token may provide the ability to establish this secure session with the IP Gateway, and thereby with the payment processing network, by comprising embedded codes containing the IP address of the IP Gateway as well as any necessary code for establishing the secure channel.

In this regard, embodiments may include receiving first information corresponding to the verification token using the secure communication channel. The first information may include at least one of: a token serial number, data encrypted with a unique key, and an IP address of the client computer or verification token. This information may be used to validate the verification token. For example, the payment processing network, IP Gateway, or any other entity that may validate the verification token could include a database that associates token serial numbers with an encryption key. If a verification token transmits both a serial number and a corresponding encryption key (or information encrypted with the key) that corresponds to this previously known association, then the verification token may be considered valid.

In some embodiments, in the method as described above where a risk score is generated based at least in part on the received verification information, transaction information, and account information, the step of receiving verification information comprises receiving information indicating whether the verification token and/or account information is valid. In this regard, an advanced authorization system (and/or a merchant processor) may use the fact that the token was validated in generating a risk score for the financial transaction. Although not limited to ecommerce implementations, the verification token may be useful in such environments because typically a portable device is not presented (such as to a merchant at a POS), but a user typically enters relevant information that may be located on, for instance, a payment card to complete a transaction. The use of a verification token that interacts with a portable device may provide additional information for use in generating a risk score that the user is in possession of the portable device and did not, for instance, simply copy the relevant numbers of a portable device so as to defraud the merchant or issuer.

In some embodiments, in the method as described above where a risk score is generated based at least in part on the received verification information, transaction information, and account information, the step of receiving the verification information further includes receiving a first dynamic verification value corresponding to the portable device and receiving a second dynamic verification value associated with the first transaction. That is, for instance, after the verification token is validated for a portable consumer device, the IP Gateway, payment processing network or other validation entity may send a dynamic verification value (e.g. dCVV2) that may be used in a later transaction by the user. This dynamic verification value may also be sent to an authorization system or payment processing network, and thereby essentially create a shared secret between the user (or the verification token) and the authorization system and/or payment processing network. The dynamic verification value can be used in a subsequent transaction or transactions to provide evidence that the transaction is not fraudulent.

Continuing with this exemplary embodiment of the method described above, the step of receiving the second dynamic verification value may include receiving the second dynamic verification value from the client computer or the verification token. That is, after the verification token has been validated for the portable device, the user may conduct a transaction utilizing the portable device. In so doing, the user (or the verification token, for instance, after it interacts with the payment device) may supply the dynamic verification value when providing the related transaction information, which can be compared with the first dynamic verification value that was previously sent by the IP Gateway when the verification token was initially validated.

Continuing with this exemplary embodiment, the second dynamic verification value (i.e. the dynamic verification value received from the user or verification token) may be received by an authorization system as part of the authentication request message associated with the first transaction. This may originate, for instance, from the merchant upon receiving the transaction related information from the user. In some embodiments, the step of generating a risk score associated with the first transaction includes determining if the first dynamic verification value corresponds to the second dynamic verification value. That is, the advanced authorization system (or another component such as the payment processing network) may simply compare the two values (the first value received from the payment processing network and the second value received from the user). If the two dynamic verification values match, then it is probable that this user and portable device were validated previously (and therefore the user likely has the portable device). In some embodiments, the step of receiving the verification information includes receiving information indicating whether the first dynamic verification value corresponds to the second dynamic verification value. That is, in some embodiments, the authorization system may receive only an indication as to whether the first and second dynamic verification values correspond, and may not receive the actual dynamic verification values.

In some embodiments, in the method as described above where a risk score is generated based at least in part on the received verification information, transaction information, and account information, the step of receiving the verification information includes receiving information corresponding to whether the token passed at least one of a plurality of validation tests. For instance, in some embodiments, there may be several validation tests that may be applied to the verification token and/or the portable device. Examples of such tests are provided in U.S. application Ser. No. 12/712,148 to Hammad, which is hereby incorporated by reference. The authorization system or other similar device may receive verification information indicating each test that was passed and each that was failed. These results may be weighted, providing additional factors in determining a risk score.

In some embodiments, in the method as described above where a risk score is generated based at least in part on the received verification information, the risk score is sent to an issuer or a merchant, whom then may make a decision based on the risk score as to whether to authorize the transaction. Each entity may have a different tolerance to the level of risk it is willing to accept in authorizing a transaction. In some embodiments in which the risk score is sent to an issuer, the method as described above further includes receiving from the issuer an authorization response message corresponding to the first transaction. The authorization response message may be based at least in part on the risk score and reflects the determination as to whether the transaction should be approved.

In some embodiments, in the method as described above where a risk score is generated based at least in part on the received verification information, the transaction information may include at least one of a transaction amount, a velocity value, and a merchant identifier. As defined above, the account information may include at least one of an account number, an expiration date, a card verification value, and account profile information. Each of these types of information may be used to determine the risk score of a transaction and may be used in conjunction with the validation information. The transaction information and/or the account information may be received by the authorization network (including a merchant processor) and/or the payment processing network in an authorization request message associated with a transaction.

In some embodiments, in the method as described above where a risk score is generated based at least in part on the received verification information, the method further includes receiving a request for a first dynamic verification value from a user via the verification token coupled to a client computer. For instance, the verification token may be configured to generate and send a request to an IP Gateway following an interaction with a portable device. The first dynamic verification value may then be generated in response to the request and sent to the user making the request. The generation of the dynamic verification value may comprise validating the verification token and then returning the dynamic verification value via a secured channel that is established by the verification token and an IP Gateway. This exemplary embodiment is described below in detail with reference to FIG. 4. In some embodiments, the step of sending the first dynamic verification value to the user includes sending the generated first dynamic verification value to the verification token associated with the user. For instance, some embodiments may comprise the verification token maintaining the dynamic verification value hidden from the user. The verification token may be used in a subsequent transaction to send the dynamic verification value. Such embodiments may provide the advantage of conducting multiple transactions using verification information without the need to perform multiple validation tests because the dynamic verification information may be used for multiple transactions.

In some embodiments, in the method as described above, the risk score is generated at either a payment processing network or at a merchant processor. That is, in some embodiments, the authorization system may be located at the payment processing network or may be a separate component. In some embodiments a merchant processor may be located at the merchant and or the payment processing network.

In some embodiments, a server computer is provided that includes a processor; and a computer readable medium coupled to the processor. The computer readable medium comprises code executable by the processor for implementing a method that includes receiving a request for a dynamic verification value from a user via a verification token coupled to a client computer; generating a dynamic verification value in response to the request; sending the generated verification value to the verification token associated with the user making the request; and sending the generated verification value to an authorization system. The authorization system uses the generated verification value as further criteria in assessing the risk associated with a transaction conducted by the user using the generated verification value.

In some embodiments, a server computer is provided that comprises a processor; and a computer readable medium coupled to the processor, wherein the computer readable medium comprises code executable by the processor for implementing a method. The method includes receiving a request for a dynamic verification value from a user via a verification token coupled to a client computer; generating a dynamic verification value in response to the request; sending the generated verification value to the verification token associated with the user making the request; and sending the generated verification value to a merchant processor. The merchant processor uses the generated verification value as further criteria in assessing the risk associated with a transaction conducted by the user using the generated verification value.

In some embodiments, a client computer is provided. As will be described below, a client computer may take any suitable form, including a PC, mobile phone, PDA, etc. The client computer may comprise a processor; and a computer readable medium coupled to the processor that comprises code executable by the processor for implementing a method. The method may include the step of receiving account information from a portable device based on an interaction between the portable device and a verification token. That is, for instance, the client computer may be in operable communication with a verification token (such as, by way of example, the verification token may be an embedded software or hardware module within the client computer, or could comprise a periphery device such as a USB dongle). The verification token may be configured to interact with a portable device to receive the information stored thereon. For example, the verification token may comprise a contactless interface that can establish communication with a contactless device (such as a credit card or mobile phone). After the verification token establishes communication with the portable device and receives account information (such as a primary account number (PAN), CVV value, etc.) this information may be sent to the client computer. In some embodiments, the token may not send this information to a separate module in the client computer, or it may encrypt the information before doing so. By utilizing an interaction between the verification token (typically a secured device) and a portable device, this may provide evidence that the user is in possession of the portable device.

The method may further comprise the client computer sending both the account information and information associated with the verification token to a server computer. As noted above, the account information may be received based on an interaction between the verification token and the portable device. The account information may be used to associate the verification token with a particular portable device as a further means of determining the risk associated with a future transaction. That is, the account information may be linked in a database to the verification token information, such as by the token serial number or an IP address of the token and/or client computer.

The information associated with the verification token that is sent by the client computer may be used by the server computer to validate the verification token. That is, for instance, the server computer may be configured to validate a verification token based on the corresponding received information using any of the methods described below. By validating the verification token, in some embodiments, the server computer may be relatively assured that it is communicating with an authentic, secured device, and that the verification token has interacted with the portable device (i.e. the user has presented the portable device to the verification token). If the verification token is validated, then the server computer may generate information that corresponds to this validation (such as, for example, information indicating that the token serial number is valid, that the verification token is associated with a portable device or payment account, and/or may generate a dynamic verification value that may be linked to the account/portable device/verification token for later use). This information may be stored by the server computer, or sent to other entities, including the client computer.

A user may later use the client computer to conduct a first transaction with a merchant in which the user chooses to use the portable device (or an account associated with the portable device) to pay for the cost of the first transaction. In so doing, in some embodiments, the user sends relevant information for the transaction (such as the information related to the account) or it may be automatically sent, for instance, by the verification token. The client computer and/or verification token may also indicate that the verification token has interacted with the portable device by including relevant information to this effect. Furthermore, verification information may be sent to the merchant indicating that the verification token has been validated (or, for instance, the client computer may send relevant information that may be used to validate the token by the merchant or other entity). In some embodiments, the client computer may send the verification information that was received from the server computer (such as a dynamic verification value) to the merchant. The verification information may then be used by the merchant or by a third party (such as a server computer located at the payment processing network), to generate a risk score corresponding to the first transaction based at least in part on the validation of the verification token. In this manner, embodiments provide additional information that may be used to determine if a transaction is fraudulent (particularly in an ecommerce environment).

In some embodiments, the information associated with the verification token that is sent by the client computer to the server computer includes at least one of: a serial number of the verification token and an IP address associated with the client computer or the verification token. As described below, the server computer that validates the verification token may have access to similar information that may then be used to validate the verification token. For instance, the server computer may access a database with stored token serial numbers and determine if the received information corresponds to the previously known information. Moreover, in some embodiments, a verification token may be validated and or associated with a client computer or IP address, and this information may be used in future transactions involving the verification token. In some embodiments, the server computer or system that validates the verification token may have access to information identifying known fraudulent machines (e.g. serial numbers and/or IP addresses), which may then be compared with the received information from the client computer to further validate the verification token. This information may then be conveyed to an authorization system and/or merchant processor as further criteria in determining the risk associated with a transaction utilizing the verification token (i.e. by generating a risk score).

In some embodiments, for the client computer as described above, the method further comprises the step of establishing a secure communication channel with the server computer based at least in part on the information associated with the verification token. Embodiments may provide the advantage that the client computer and/or the verification token (or the combination) may thereby securely send and receive information with the server computer. The client computer can thereby send any information (including sensitive information, such as information related to the computer itself, the portable consumer device, the user, etc.) to provide further input to determining the validity of the token, or to provide additional input in assessing the risk associated with the transaction.

In some embodiments, for the client computer as described above the method further comprises the steps of receiving verification information from the server computer, wherein the verification information is generated by the server computer based on the validation of the verification token. That is, for instance and described above, after the server computer validates the verification token and/or the client computer, information indicating this validation may be sent to the user. In some embodiments in which a secure communication channel between the server computer and the client computer and/or verification token is established, this information may be used in a future transaction to confirm the identify of the user or provide additional evidence that the user is in possession of the portable device. This received verification information may be sent by the client computer to the merchant. The merchant may then utilize this information (or send the information to another entity, for instance, by including it in an authorization request message) to generate the risk score corresponding to the first transaction. In some embodiments, the verification information comprises a dynamic verification value. In such embodiments, the dynamic verification value received from the client computer may then be compared to a similar value associated with the payment account that is stored at an authentication system or merchant processor. A corresponding risk score based on this comparison (and thereby the validity of the token) may thus be generated.

In some embodiments, a merchant computer is provided. The merchant computer may comprise a processor; and a computer readable medium coupled to the processor that comprises code executable by the processor for implementing a method. The method may include the some or all of the following steps. The merchant computer may receive from a user or a client computer information related to a first transaction. This information may include an identification of the goods or services to be purchased, the transaction amount, etc. (although some or all of this information may also be generated by the merchant computer). The method may also comprise receiving account information associated with a payment account and/or a portable device. This information may comprise such payment account information as the PAN the user has selected to use to pay for the transaction, the user's name, CVV value of a portable device, etc. The merchant computer may also receive information corresponding to a verification token, such as information corresponding to whether the verification token had been previously validated. For instance, the merchant may receive a dynamic verification value that was generated by a server computer based on an interaction between the verification token and the portable device. In some embodiments, the merchant may receive information that may be used to validate the verification token, such as the token serial number and/or an IP address associated with the token or client computer.

In some embodiments, the merchant computer generates an authorization request message that comprises some or all of the information that was received from the user via the client computer and/or verification token. This may include the verification information that was received indicating whether a verification token used in the transaction had been validated. As noted above, in some embodiments, this information may comprise a dynamic verification value. The merchant may also generate or provide additional information, such as the merchant identifier. The merchant computer may send the generated authorization message to an acquirer (which may forward the authorization request to a payment processing network) or a merchant processor.

In some embodiments, where the merchant computer sends the authorization request message to a merchant processor, the merchant processor may determine a risk score associated with the transaction. The risk score may be generated based on the information received from the merchant computer (e.g. the information that was included in the authorization request message), and may include verification information related to the validation of the verification token. The generated risk score may be received by the merchant computer. The merchant and/or merchant computer may then determine whether to approve the transaction based on the generated risk score. For instance, the merchant may have predetermined a level of risk associated with a transaction that it is willing to accept to proceed with a transaction. If the received risk score is greater than that value, the merchant may send a response message to the client computer indicating that the transaction has been declined. If the generated risk score is lower than a predetermined value, then the merchant computer may approve the transaction and send the authorization request message to an acquirer (which may then forward the authorization request message to a payment processing network). In some embodiments, prior to generating an authorization request message, the merchant computer sends information pertaining to the first transaction and the user (including information related to the validation of a verification token) to a merchant processor to determine the risk associated with the transaction.

In some embodiments, where the merchant generates an authorization request message comprising information related to the transaction including verification information as to whether the verification token was validated, the merchant computer may send the authorization request message to an acquirer. The acquirer may then forward the authorization request message and the information contained therein to a payment processing network. The payment processing network may send relevant information (such as the account number associated with the payment account, transaction related information such as the amount of the transaction, verification information, etc.) to an authorization system, which then determines the risk associated with the transaction. In some embodiments, the authorization system is located at the payment processing network. The generated risk score may then be sent to an issuer or may be included in an authorization request message that is then forwarded to the issuer. The issuer may then determine whether to approve or decline the transaction based at least in part on the generated risk score. The issuer may then generate an authorization response message approving or declining the transaction.

In some embodiments, the method performed by the merchant computer as described above may further comprise receiving the authorization response message at the merchant computer via the payment processing network. If the transaction is approved, then the merchant computer may complete the transaction using the payment account provided by the user and/or may send to the user an indication that the transaction is approved. If the transaction is declined by the issuer, then the merchant sends to the client an indication that the transaction was declined and may, in some embodiments, request a different payment method. By providing the additional information related to the validation of the verification token in determining the risk associated with a financial transaction, the merchant may be less likely to either approve fraudulent transactions or decline legitimate transactions. This may be particularly useful in some embodiments (such as in ecommerce environments) in which the merchant does not directly interact with a portable consumer device.

Specific details regarding some of the above-described aspects are provided below. The specific details of the specific aspects may be combined in any suitable manner without departing from the spirit and scope of embodiments of the invention.

I. Exemplary Systems

A system according to an embodiment of the invention is shown in FIG. 1. FIG. 1 shows a system 20 that can be used in some embodiments of the invention.

The system 20 may include a plurality of merchants, access devices, portable devices, acquirers, and issuers. For example, the system 20 may include a merchant computer 22 associated with a merchant, an acquirer computer 24 associated with an acquirer, and an issuer computer 28 associated with an issuer. A payment processing network 26 may be between the acquirer computer 24 and the issuer computer 28. Further, the merchant computer 22, the acquirer computer 24, the payment processing network 26, and the issuer computer 28 may all be in operative communication with each other.

A client computer 36 may communicate with the merchant computer 22 via a communications network such as the Internet 72. A verification token 34 may be associated with the client computer 36 that is used by a user 30. It may allow the client computer 36 to form a first secure communications channel 38 (an example of a first channel) to an Internet Protocol Gateway (IPG) 27, which may be in operative communication with the payment processing network 26. Although the IPG 27 is shown as being a separate entity in FIG. 1, the IPG 27 could be incorporated into the payment processing network 26, or could be omitted. In the latter situation, the first secure communications channel 38 could directly connect the payment processing network 26 and the client computer 36.

The client computer 36 may be in any suitable form. Examples of client computers may include phones, televisions, personal computers, laptop computers, PDAs, set top boxes, tablet computers, cars, and other computing devices. In some embodiments, the client computer 36 may comprise a processor, and a computer readable medium coupled to the processor. The computer readable medium may comprise code, executable by the processor, for implementing a method comprising: receiving account information from a portable device that interacts with a verification token, wherein the portable device 32 may comprises a chip storing the account information; establishing a secure communications channel with a remote server computer (e.g. IPG 27); and forwarding the account information associated with an account to the server computer, wherein the server computer thereafter may validate the verification token 34 and/or the portable device 32. In some embodiments, some or all of the steps described above may also be performed by the verification token 34.

The payment processing network 26 may reside between the acquirer computer 24 and an issuer computer 28. The path which includes the merchant computer 22, the acquirer computer 24, and the payment processing network 26, may form at least part of a second communications channel.

As used herein, an "issuer" is typically a business entity (e.g., a bank) that maintains financial accounts for the user 30 and often issues a portable device 32 such as a credit or debit card to the user 30. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Embodiments of the invention encompass such single entity issuer-acquirers.

The portable device 32 may be in any suitable form. In some embodiments, consumer devices are portable in nature and may be portable devices. Suitable portable devices can be hand-held and compact so that they can fit into a consumer's wallet and/or pocket (e.g., pocket-sized). They may include smart cards, keychain devices (such as the Speedpass™ commercially available from Exxon-Mobil Corp.), etc. Other examples of portable devices include cellular phones, personal digital assistants (PDAs), pagers, payment cards, security cards, access cards, smart media, transponders, and the like. The portable devices can also be debit devices (e.g., a debit card), credit devices (e.g., a credit card), or stored value devices (e.g., a stored value card).

The payment processing network 26 may include data processing subsystems, networks, and operations used to support and deliver authorization services, exception file services, and clearing and settlement services. For example, the payment processing network 26 may comprise a server computer, coupled to a network interface, and a database of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 26 may use any suitable wired or wireless network, including the Internet 72.

In some embodiments, payment processing network 26 may comprise an authorization system 25. Various exemplary embodiments of systems and methods for advanced authorization are discussed in U.S. patent application Ser. No. 10/863,813 entitled "Method and System for Providing Risk Information in Connection With Transaction Processing" filed on Jun. 7, 2004, which is incorporated herein by reference in its entirely for all purposes. The authorization system 25 may comprise a server computer and/or one or more databases. As shown in FIG. 1, the authorization system 25 is operatively coupled to the payment processing network 26; however, in some embodiments the authorization system 25 could be part of the payment processing network 26 or a separate entity. In some embodiments, components of the authorization system 25 may be located at multiple entities, such as at payment processing network 26, issuer computer 28, and/or merchant computer 22.

The authorization system 25 may utilize verification information (for the verification token and/or a portable device), transaction information, and/or account information to determine the risk that a transaction is fraudulent. The authorization system 25 may utilize any relevant information (including past transactions and validation attempts) to generate a risk score for a current transaction, which may be used by any entity shown in FIG. 1, such as merchant computer 22, payment processing network 26, and issuer computer 28. An exemplary authorization system 25 is described below with reference to FIG. 2.

In some embodiments, a merchant processor 23 may be provided. As shown in FIG. 1, the merchant processor 23 may be operatively coupled to the merchant computer 22. However, embodiments are not so limited and the merchant processor 23 may be located at any suitable location, including at the merchant, the acquirer, or the payment processing network 26. The merchant processor 23 may include merchant payment options such as traditional eCommerce (secure data hosting-card on file), authenticated eCommerce (e.g., Verified by Visa (VBV)), mCommerce, Authenticated mCommerce (mVBV), Remote payment, Paycliq, etc. An example of a merchant processor 23 is CyberSource®. Although shown and described separately from the authorization system 25, in some embodiments both the merchant processor 23 and the authorization system 25 may comprise similar components, and may perform similar functions. Typically, the merchant processor 23 provides information that may be utilized by the merchant and/or merchant computer 22, whereas the authorization system 25 generates information (e.g. risk scores) that may be used by an issuer and/or issuer computer 28. However, embodiments are not so limited. The merchant processor 23 may comprise a server computer and/or one or more databases.

The merchant processor 23 may utilize verification information (for the verification token and/or a portable device), transaction information, and/or account information to determine the risk that a transaction is fraudulent. The merchant processor 23 may utilize any relevant information (including past transactions and validation attempts) to generate a risk score for a current transaction, which may be used by any entity shown in FIG. 1, such as merchant computer 22, payment processing network 26, and issuer computer 28. An exemplary merchant processor 23 is also described below with reference to FIG. 2.

Although many of the data processing functions and features of specific embodiments of the invention may be present in the payment processing network 26 (and a server computer therein), it is understood that such functions and features could alternatively be present in the issuer computer 28, and need not be present in the payment processing network 26 or server computer therein.

Figure 2:
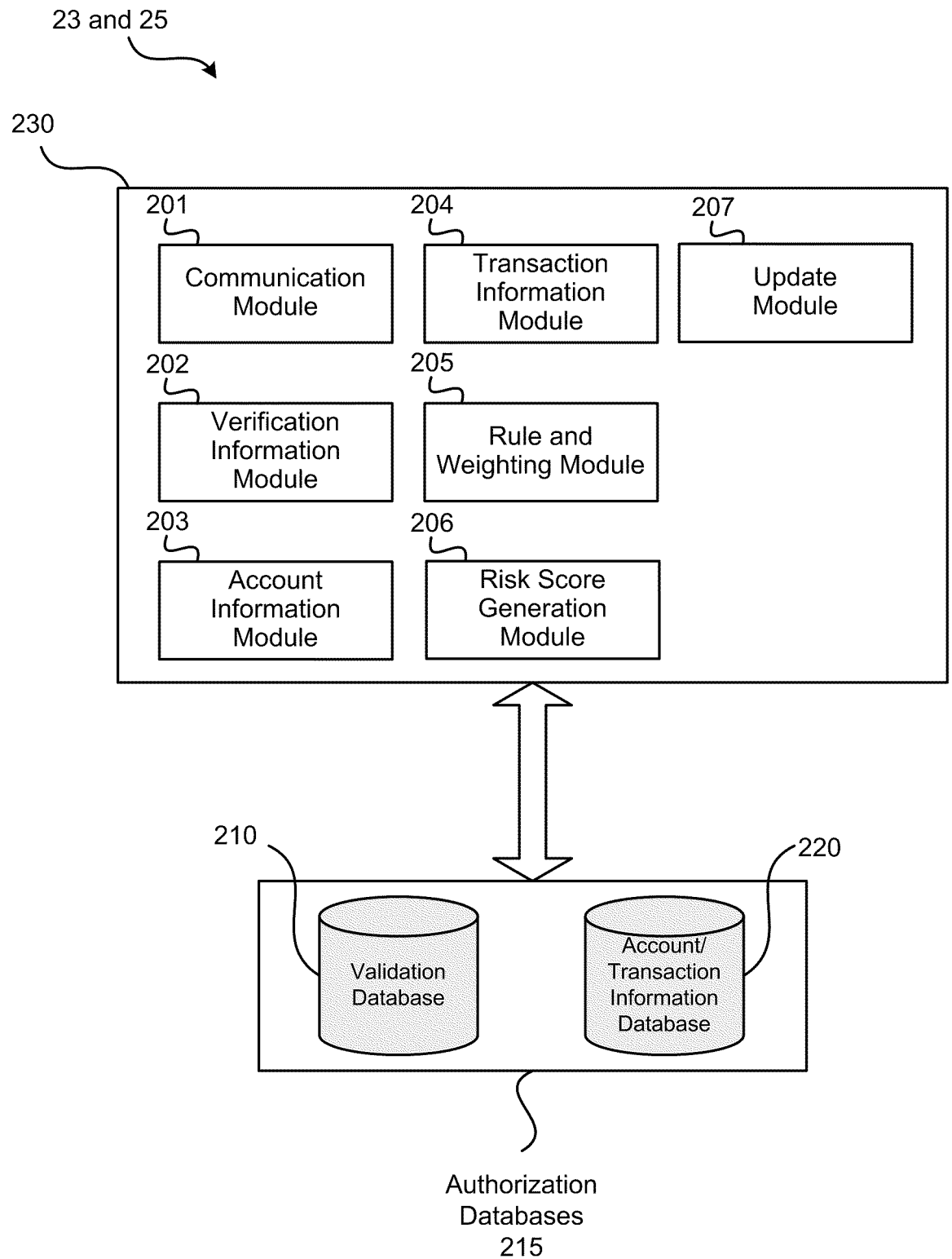
FIG. 2 shows a block diagram of an exemplary authorization system according to some embodiments.

With reference to FIG. 2, an exemplary authorization system and/or merchant processor 25 is shown. For simplicity, FIG. 2 will be referred to as an authorization system, however, the components and functionality discussed therein are the same for an exemplary merchant processor.

FIG. 2 provides a more detailed illustration of an exemplary embodiment of a system for implementing some of the functionality for utilizing verification information to determine the risk of a transaction, and specifically a server computer 230 that may perform functions in accordance with aspects of the present invention. This server computer 230 may, for example through the use of software instructions and/or hardware configurations, perform some or all of the relevant functions and steps described at least with reference to FIGS. 3 and 4. It should be noted that although FIG. 2 illustrates all of the modules located on a single device, the disclosure is not meant to be so limited. A system for implementing functionality related to, for example, utilizing verification information based on an interaction between a portable device and a verification token may have additional components or less then all of these components. Additionally, some modules could be located on other devices such as a remote server or other local devices that are functionally connected to the server computer component(s).

The communication module 201 may be configured or programmed to receive and transmit information through the network to any of the entities shown in FIG. 1. The received information may comprise, for instance, verification information (e.g. whether the token and/or portable device is valid), transaction information, account information, and/or any other information that the authorization system 25 may utilize in determining the risk of a transaction. In some embodiments, the received information may also comprise whether an authorization entity (e.g. an issuer or merchant) approved or declined a transaction. The communication module 201 may transmit any received information to the appropriate module, including the verification information 202, account information 203, transaction information 204, and/or update 207 modules. The communication module 201 may also be configured or programmed to receive from the risk score generation module 206 a risk score associated with a transaction and to transmit the risk score to an appropriate entity. In some embodiments, the received and transmitted information may in the form of an authorization request message. In some embodiments, the communication module 201 may also request information that may be stored at the payment processing network 26 and/or an issuer computer 28. Such information may comprise, for instance, information associated with an account, portable device, or verification token used in the transaction (such as PANs, CWs, past transaction information, etc). This information may then be utilized by the authorization system 25 in determining the risk associated with the transaction.

The verification information module 202 may be configured or programmed to perform some or all the functions associated with utilizing verification information in the authorization system 25. This may include receiving verification information from the communication module 201 and determining the appropriate factors and weights to be applied based on information received from the rule and weighting module 205. For instance, an authorization system 25 may be programmed or configured to consider only validation of the verification token using a particular method (e.g. using the method whereby a token serial number and encryption key are checked). The verification information may extract this information from the received information and send it to the risk score generation module 206. In some embodiments, the verification module 202 may apply the appropriate risk score rules and weights to the verification information, and may send only an intermediate risk score or probability associated with the transaction based on the verification information to the risk score generation module 206. The verification information module 202 may also query the validation database 210 for information previously received and stored related to the transaction, including information associated with the verification token and/or the portable device. This information may be compared to the current transaction information to further assess the validity of the transaction and/or the validity of the verification token 34.

In some embodiments, the verification information module 202 may perform one or more steps to validate (or further validate) the verification token 34 and/or portable device 32 associated with the transaction. For instance, the information received by the verification information module 202 may comprise a dynamic verification value that was based on a previous interaction between the verification token 34 and a portable device 32 used in the transaction. The verification information module may query the validation database 210 information for information stored therein associated with the portable device 32 or the verification token 34. The verification information module 202 may then compare the received dynamic verification value with the stored dynamic verification value. If the values correspond (or if they do not), then the verification module may submit this information to the risk score generation module 206.

The account information module 203 and the transaction information module 204 may be configured or programmed to perform some or all the functions associated with utilizing account and transaction information, respectively, in the authorization system 25. For instance, the account information module 203 and the transaction information module 204 may be programmed or configured to receive transaction or account information, respectively, associated with the transaction from the communication module 201 and to determine the appropriate factors and weights to be applied based on information received from the rule and weighting module 205. Each of these modules may then send to the risk score generation module 206 information that is relevant to determining the risk score associated with the transaction, or a preliminary risk score or factor based on the transaction or account information alone.

In some embodiments, the transaction information 204 and account information 203 modules may be programmed or configured to query the account/transaction information database 220 for information about previous transactions. For instance, the account information module 203 may query the account/transaction information database 220 for information as to whether a payment account associated with the portable device 32 (or the portable device itself) has been previously involved in any fraudulent transactions. The transaction information module 204, for example, may query the account/transaction information database 220 for information related to previous transactions for the portable device 32 to determine the velocity of activity on the account. This information may in some embodiments be received based on a query sent to payment processing network 26 (i.e. some or all of the authorization databases 215 may be located at the payment processing network). The account information 203 and transaction information 204 modules may send any and all relevant information to the risk score generation module 206.

The rule and weighting module 205 may be configured or programmed to maintain the rules for determining the risk score associated with a transaction based on the factors known about each kind of information. This module may also be programmed and adjusted by an entity (such as payment processing network 26) to alter or change the risk score (and how the risk score is calculated) based on certain factors for a transaction. The rule and weighting module 205 may provide to the verification information 202, the account information 203, the transaction information 204, and/or the risk score generation 206 module, information as to the data that may be considered in developing a risk score for the transaction, as well as the meaning or weight to assign to each of the factors.

The rule and weighting module 205 may also have information that pertains to how the presence or absence of one type of information may change (e.g. make more or less relevant) based on other information. That is, the presence or absence of factors may alter the rules as to the weight to be assigned to another factor. Although referred to here as "weighting" factors, embodiments are not so limited and may pertain to any manner of using this information to determine the likelihood that a transaction is fraudulent.

The risk score generation module 206 may be configured or programmed to generate a risk score associated with the transaction based on the verification information, the account information, and the transaction information, as well as any other information or combination thereof. The risk score generation module 206 may thereby be configured to query or receive from the verification information 202, the account information 203, the transaction information 204, and the rule and weighting module 205 some or all of the information that is relevant to the generation of the risk score. This may comprise, for instance, whether the verification token 34 was used in the transaction, whether the verification token 34 was validated, which tests the verification token 34 passed, and/or any other information (e.g. other verification information, transaction information, and/or account information) that may be considered useful in identifying fraudulent transactions. The risk score generation module 206 may provide a generated risk score to the communication module 201 along with other information such as reasons codes or a report that may include an explanation of how the risk score was generated.

The update module 207 may be programmed of configured to maintain and update the authorization databases 215. In this regard, the update module may receive information about a past transaction from some or all of the other modules discussed above. Moreover, the update module may receive information from other sources, such as directly from the payment processing network 26 and/or the IP Gateway 27 (such as, for example, a generated dynamic verification value for a verification token 34 associated with a client computer 36 and/or a portable device 32). By maintaining information about past transactions, it may be possible in some embodiments to generate more accurate risk scores for present transactions.

The validation database 210 may comprise information received and stored about the validation of a verification token 34 and/or a portable device 32. Such information may include, for instance, verification token serial numbers that have been identified as fraudulent or have been used successfully in previous transactions (that is, transactions that were approved by an appropriate authority and/or were not later found to be fraudulent), IP addresses associated with a verification token or client computer known to be fraudulent (or not fraudulent), etc. The validation database 210 may also comprise received dynamic verification values from previously validated verification tokens. This information may be used by the authorization system 25 to validate the verification token 34 and/or portable device 32.

The account/transaction information database 220 may be programmed or configured to comprise information associated with accounts and/or a verification tokens. The information may be used to generate a risk score for a current transaction. Such information may include previous transaction information (such as volume, amount, merchant identifiers, etc.) as well as information as to whether the account has been used in fraudulent transactions in the past (i.e. a listing of account numbers used in prior fraudulent transactions, IP addresses used, etc.). However, any information that may be used to generate a risk score may be included.

II. Exemplary Methods

Figure 3A:
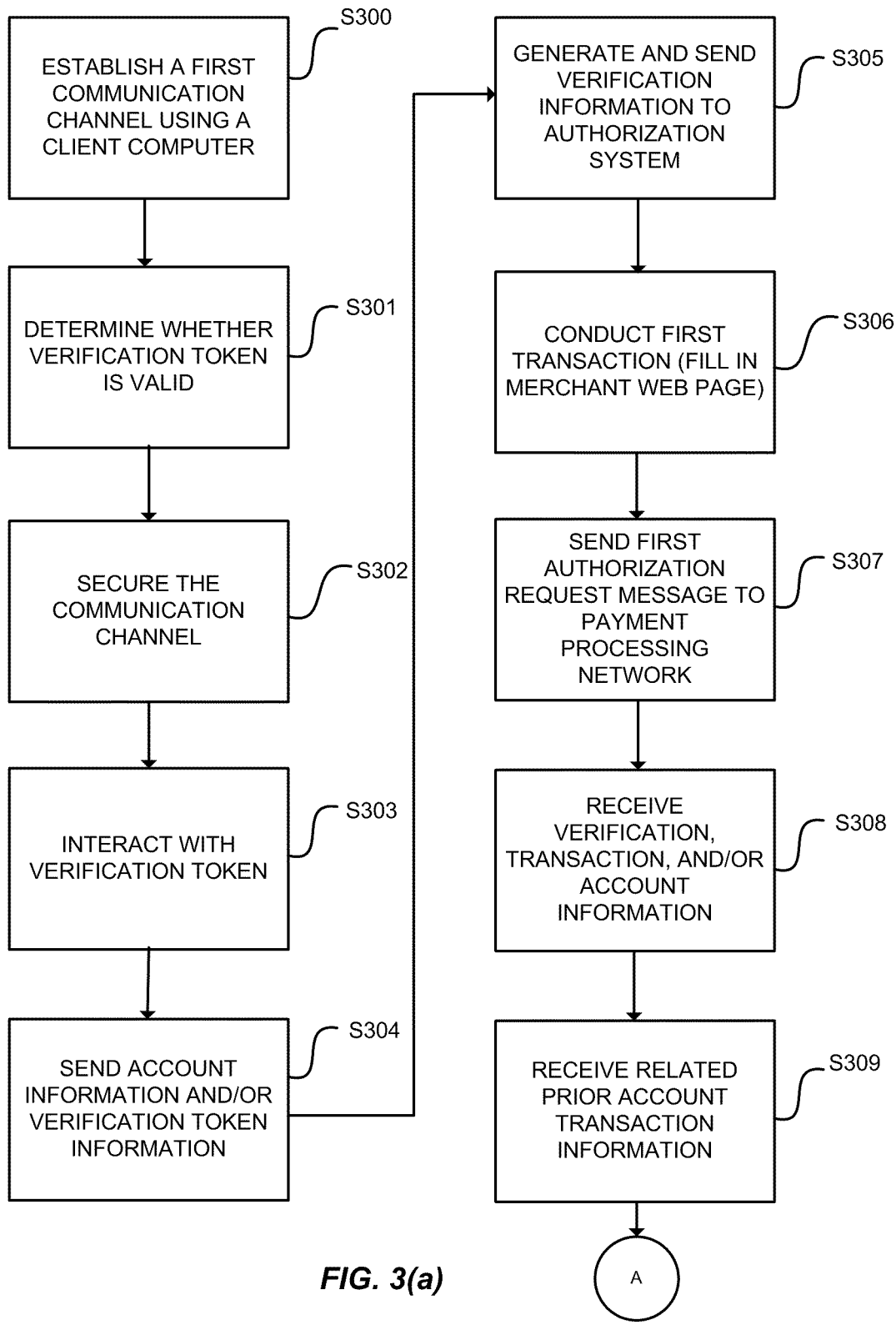
FIGS. 3(a) and 3(b) show flowcharts illustrating methods of using token validation for advanced authorization according to some embodiments.
Figure 3B:
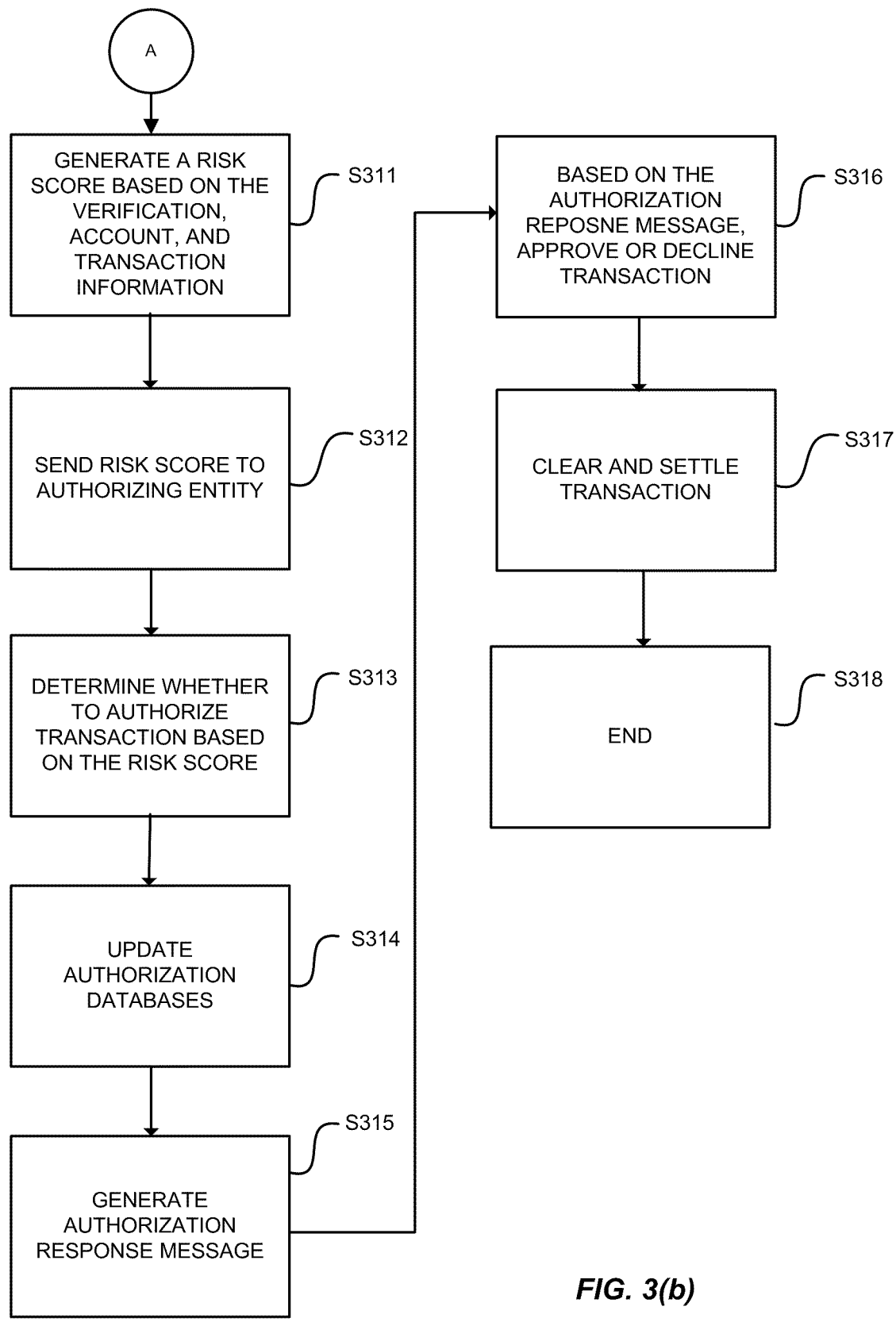
Figure 4:
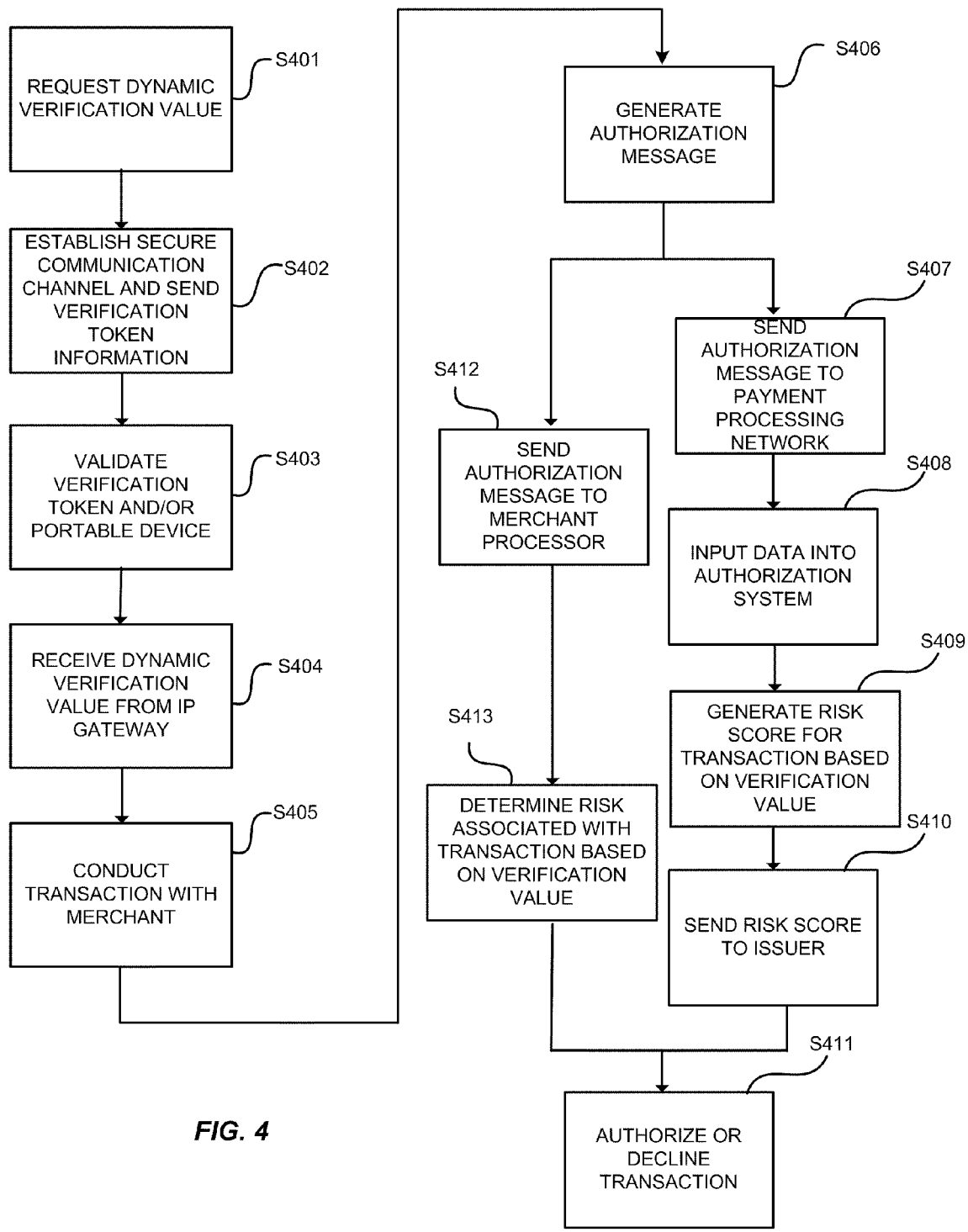
FIG. 4 shows a flowchart illustrating a method according to some embodiments.
Figure 5:
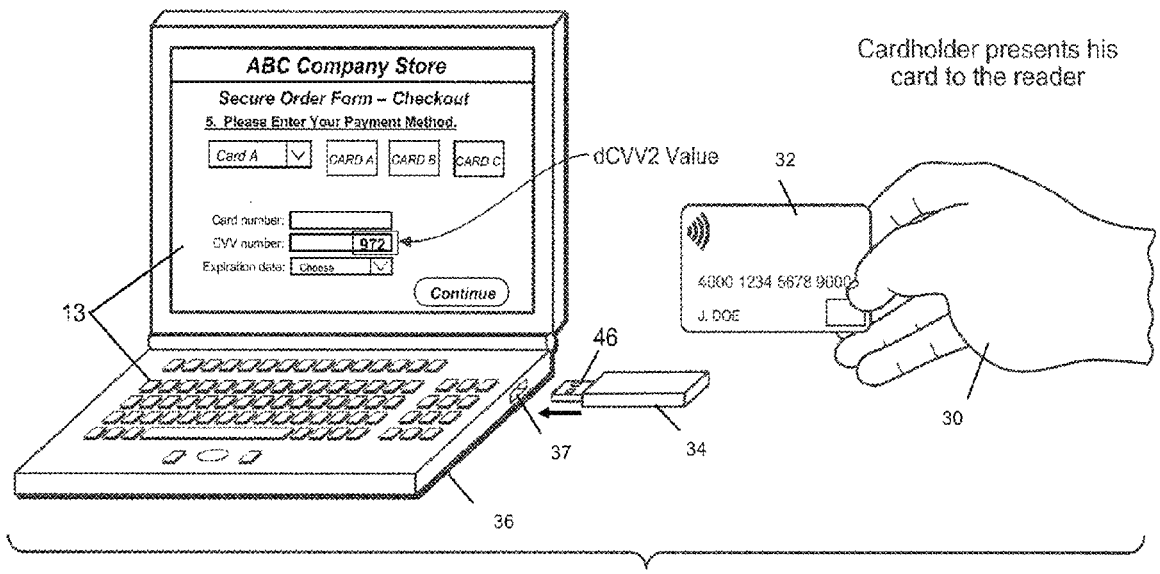
FIG. 5 shows a picture of a person interacting with an exemplary verification token that is associated with a client computer.

Methods according to embodiments of the invention are described FIGS. 3-4 with reference to the system elements in FIG. 1-2, as well as FIG. 5. The methods described below are exemplary in nature, and are not intended to be limiting. Methods in accordance with embodiments described herein may include some or all of the steps described below, and may include steps in a different order than described below.

Referring to FIGS. 1 and 5, prior to establishing the first communication channel 38, in embodiments of the invention, a user 30 may receive a verification token 34 from his or her financial institution. In some embodiments, the user 30 may receive the verification token 34 from another entity on behalf of a financial institution.

With reference to FIG. 5, in some embodiments the user 30 can then connect the verification token 34 into the USB port 37 of his client computer 36 via a connector 46. The client computer 36 can power the verification token 34. Once it is connected to the client computer 36, it can recognize the presence of the verification token 34 as a valid device, and the verification token 34 can self-install. The verification token 34 can then check with the client computer 36 to check for Internet connectivity. Note that although the client computer 36 and the verification token 34 are shown as separate devices in FIG. 4, in some embodiments, the verification token 34 may be part of the client computer 36.

If Internet connectivity is available, the verification token 34 can then automatically attempt to establish a background SSL session to the IPG 27 so that it can be used as a part of an authentication process.

Figure 6:
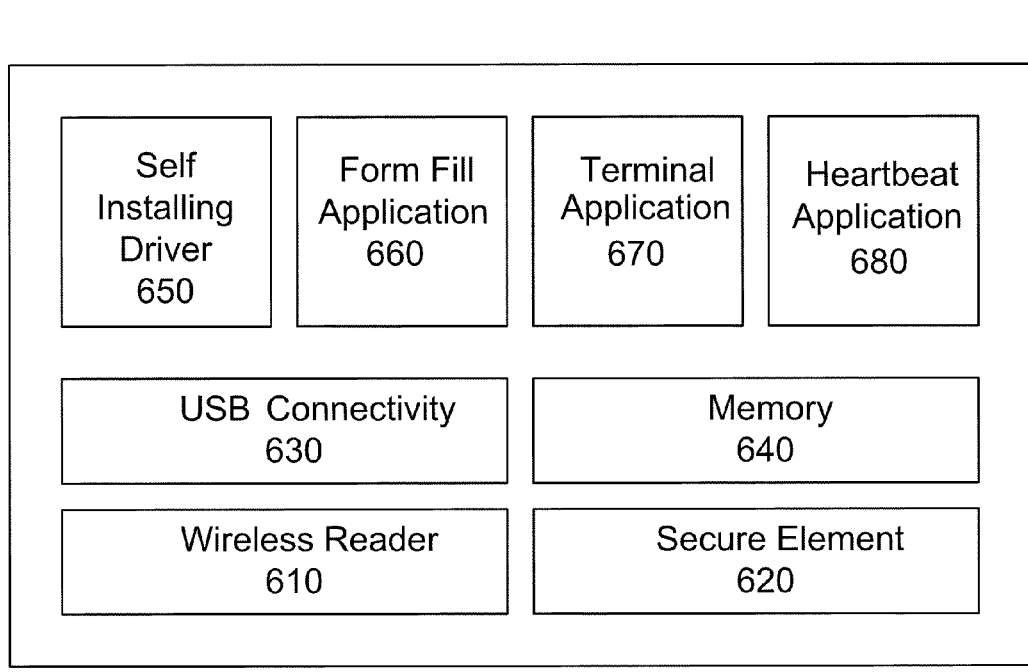
FIG. 6 shows a block diagram of some components of a verification token according to some embodiments.

FIG. 6 shows some components that can be present in the verification token 34. It may include an application, such as the self-installing driver 650, so that the verification token 34 may install itself automatically after the verification token 34 is inserted into and recognized by the client computer 36. The verification token application may then be able to connect to a backend host, perhaps at a predefined IP address, using a background secure SSL browser session. A terminal application 670 and heartbeat application 680 may be used to establish and maintain this browser session. If the session connection is successfully established, the verification token 34 may identify itself to the IPG 27 by providing its unique token serial number and/or IP address to the IPG 27. Other information may also be passed (e.g., password, encryption keys, etc.) to the IPG 27 at this point.

The embodiment of the verification token 34 illustrated in FIG. 6 is a USB token that includes a USB connectivity module 630, a secure element 620 (e.g., a chip such as a smart card chip, which has sufficient data and security protocols and hardware), a wireless/contactless reader 610 capable of reading payment data from a portable device, built in memory 640, a self-installing driver 650, a form fill application 660, a terminal application 670, and a heartbeat application 680. The verification token 34 may also have other features such as a keyboard buffer capability and a unique serial number associated with the verification token 34. The verification token 34 can have little or no footprint on the client computer 36 when it is plugged into a standard client computer with Internet connectivity.

Although FIGS. 5 and 6 illustrate a verification token 34 as a device similar to a USB stick, as noted above this is simply an illustrative embodiments and the verification token may comprise many other forms. For example, the verification token 34 may be piece of hardware or other module installed into a computer, consumer device, or other device.

Reference will now be made to the exemplary embodiment shown in FIGS. 3(a) and 3(b). Again, this is an exemplary embodiment that is described for illustration purposes only.

With reference to FIG. 3(a), at step S300, the user 30, using the client computer 36, establishes a first communication channel 38 to a gateway server computer, such as an Internet Protocol Gateway (IPG) 27. The IPG 27 can be in communication with a payment processing network 26. Note that in the description below, the gateway server computer and a payment processing network server could be embodied by a single or separate computer apparatuses. Such computer apparatuses may function separately or together to facilitate the functions described herein.

At step S301, the verification token 34 may send to the IPG 27 information that may be used to perform a mutual validation (i.e. authentication). For instance, the verification token serial number associated with the verification token 34 and related credentials may be validated using, for example, information accessible in a remote or local database, or any other method such as those described above and detailed in U.S. patent application Ser. No. 12/712,148 to Hammad entitled "Verification of Portable Consumer Devices," which is hereby incorporated by reference in its entirety. If valid, the IPG 27 may calculate a UDK (unique derived key) for the token based on a master key and the serial number. A unique derived key (UDK) can be stored in the token secure element 620. This host-token mutual authentication may use a Triple DES based algorithm. In some embodiments, the verification token 34 may interact with portable device 32 prior to establishing the first communication channel and/or validating the verification token 34.

If mutual authentication of the verification token 34 and the IPG 27 is successful, at step S302 the first communication channel may be secured. For instance, the IPG 27 can register the verification token 34 and its IP address for the session. A session key is established upon mutual authentication to support all the communication for that session between the verification token 34 and the host. All the data exchanged between the token and the backend host can be encrypted and tunneled through an SSL session. The session could stay alive or be terminated or restarted at any time. At this point, the IPG 27 is aware of the verification token 34, the token serial number, session key, and IP address associated with verification token 34. In some embodiments, a dynamic verification value (e.g. dCCV2) may be sent to the token at this time. In some embodiments, a dynamic verification value will be sent only after it is requested by the verification token 34. This is described in more detail with reference to the exemplary embodiments discussed in FIG. 4. In some embodiments, the verification token 34 can allow the client computer 36 to establish the secure first communications channel 38 with the IPG 27 by using cryptograms generated each time the portable device 32 interacts with the verification token 34.

At step S302, a user may again (or for the first time) interact with the verification token 34. As noted above, this interaction may occur prior to the securing the communication channel between the IPG 27 and verification token 34. An example of such an interaction is shown in FIG. 5, wherein the portable device 32 can be a payment device, such as a credit card, and can be used to interact with the verification token 34 (e.g., a USB dongle) that is associated with the client computer 36. The portable device 32 can comprise a chip comprising chip card type data such as a dynamic counter, dynamic verification value, personal account number (PAN), cryptogram, user information, expiration date, card number, issuer information, etc.

In some embodiments as described above, the chip on the portable device 32 can interact with the verification token 34 through a contact interface and/or a wireless short range communication (such as near field communications—e.g., contactless) interface. Accordingly, as noted above, the verification token 34 can include a reader having a contact and/or contactless capabilities. Some embodiments may utilize readers that can read the magnetic stripe that may be present on a portable device. During the interaction between the verification token 34 and the portable device 32, the verification token 34 can receive the chip type formatted data from the portable device 32. The verification token 34 may power the portable device 32 to collect account information such as one or more of account numbers, cryptograms, CW and CW2 values for a transaction. Other data that may be collected from the same or another source may include a session key with the IPG 27. The verification token 34 may then encrypt this collected data.

At step S304, the client computer 36 may send the account information and any other information (such as information associated with the verification token 34) to the IPG 27 through the first communication channel 38, preferably in encrypted form. The IPG 27 may then send the account information to the payment processing network 26, an authorization system 25, and/or merchant processor 23 where the data is stored in a database.

At step S305, verification information may be generated by the IPG 27 and/or the payment processing network 26. This information may comprise, for instance, an indication as to whether the verification token 34 was validated in step S301. In some embodiments, the validity determination at step S301 (or a subsequent validation that may occur, for instance, when a first transaction is conducted at step S306) may comprise multiple validity tests, and the verification information may indicate which tests were passed and which were failed. In some embodiments, the verification information comprises a dynamic verification value that may be sent to both the authorization system 25 (or the payment processing network 26) and to the verification token 34. The dynamic verification value may be used in a subsequent transaction to validate the payment account associated with a portable device 32 or verification token 34.

At step S306, the user 30 may conduct a transaction with a merchant. In some embodiments, for instance in an ecommerce environment, this may comprise completing information on a merchant webpage. In some embodiments, based in part on the previous interaction between the verification token 34 and the portable device 32 (e.g. at step S303), the verification token 34 may utilize the information received from the portable device 32 to complete some or all of the information needed for the first transaction. For instance the verification token 34 may use a form fill application 660 to form fill the PAN, the shipping addresses, expiration date, CW values, etc. In some embodiments, where a dynamic verification value is used (e.g. a dCW2), the verification token 34 may also enter this information as well. This is illustrated in FIG. 5.

Thus, in some embodiments, the verification token 34 can include a software module that includes instructions (e.g., computer code) executable by a processor for communicating the portable device data when the checkout page is presented to the user 30. This information can include the user's personal information including a payment card number, expiration date, billing information, name, and the verification value (e.g., dCVV2) that was obtained through the first channel of communication from the payment processing network 26 and the IPG 27. When the portable device data is entered into the checkout page and is confirmed (e.g., through a 'submit' or similar type button), the data is forwarded to the merchant computer 22 through the first communication channel, which can be securely established through a medium such as the Internet.

At step S307, a first authorization request message is generated by the merchant computer 22. This may be generated by the merchant computer 22 in response to the transaction conducted by the user 30 in step S306, and may include some or all of the information received from the client computer 36. It may also comprise information related to the transaction including merchant information (such as a merchant identifier). The authorization request message may be sent to the payment processing network 26 and/or an authorization system 25.

At step S308, the authorization system 25 (or the merchant processor 23 in some embodiments) receives the verification information, transaction information, and the account information associated with the transaction. This may be received by the communication module 201. The verification information could have been previously received (e.g. in the form of a dynamic verification value or as information associated with a token serial number and/or account information) and stored in the validation database 210. In some embodiments, prior to step S308, a first dynamic verification value previously received by the payment processing network 26 is compared to a second dynamic verification value received in the authorization request message. The results of this comparison (i.e. whether they correspond and thereby indicate that the verification token is authentic) is sent to the authorization system 25 as comprising the verification information. In some embodiments, the authorization system 25 may determine the validity of the token based on received information, as was described above with respect to the verification module 202. In such cases, it is contemplated that "receiving" the verification information comprises receiving the information that is used in the validation test. This information may then be sent to (and thereby received by) the risk score generation module 206.

At step S309, information related to past transactions (including, for example, activity related to the account associated with the current transaction) may be received. This may comprise the account information module 203 and the transaction information module 204 querying the account/transaction information database 220 for relevant information, as was described above with respect to FIG. 2. This information may be used in conjunction with the verification information received by the verification information module 202 as factors in determining the risk score of the transaction.

At step S311, a risk score associated with the transaction is generated based on the received verification information, account information, and transaction information. This may be performed by the risk score generation module 206, as was described above. For instance, the risk score generation module 206 may calculate the risk score based on whether a verification token 34 was used in the transaction and whether it was validated (e.g. whether a first and second dynamic verification value, or whether the verification token passed some or all of a plurality of validity tests), whether the account associated with the transaction has been involved in any fraudulent transactions, and/or the amount of the transaction (e.g. whether it is a large transaction amount). Each of these exemplary factors may be assigned a different value by the rule and weighting module 205, and the relation between factors and how that affects the risk score may also be provided. In this and similar manners, a risk score may be generated for the transaction in some embodiments.

At step S312, the risk score may be sent to an authorizing entity, such as an issuer or a merchant. In some embodiments, the risk score may be included in an authorization request message. In some embodiments, the risk score may further comprise reason codes that indicate the factors that were considered (and their respective impact on) the generation of the risk score. At step, S313, the authorizing entity may then determine whether to approve or reject the transaction based at least in part on the calculated risk score indicating the likelihood that the transaction may be fraudulent.

At step S314, after the risk score is generated, authorization databases 215 may be updated with relevant information regarding the transaction by the update module 207, which may include whether the transaction was approved or rejected based on the risk score generated in step S311. This may provide additional information used to determine whether future transactions are fraudulent, which may be later considered by authorization system 25.

At step S315, the authorizing entity (e.g. the issuer) may generate an authorization response message that is based on the risk score and the entities aversion to risk in approving a transaction. The authorization response message (which may approve or decline the transaction) may be sent to the payment processing network 26. At step S316, the payment processing network 26 may receive the authorization response message and approve or decline the transaction accordingly, which may then be conveyed to the merchant computer 22 and the user 30. At step S318, the normal clearing and settling of any approved transactions is completed between the acquirers and the issuers.

Embodiments of the invention are not limited to the above-described embodiments. For example, in some embodiments, rather than or in addition to establishing a secure communication channel in step S302, the verification token 34 may be used to send information as part of a current transaction. That is, for instance, user 30 via the client computer 36 may initiate a first transaction with a merchant computer 22. The user 30 may be prompted to submit his payment information, which he may do by using a portable device 32 to interact with a verification token 34. The verification token 34 may send the information related to the portable device 32 as well as information related to the verification token 34 that may be used to validate the token. This information may then be sent to the payment processing network 26 (e.g. via an authorization request message that comprises the transaction and account information as well), where the token is validated using one or more validity tests. The results of the validity tests (i.e. the verification information) may then be sent along with the transaction information and account information for the transaction to an authorization system 25. The authorization system 25 may then use the verification information to generate a risk score for the transaction.

In some embodiments, where a merchant processor 23 is utilized, prior to step S307, the verification information (indicating whether a verification token 34 has been validated), account information, and transaction information may be sent to the merchant processor 23. The merchant processor 23 may determine a risk score associated with the transaction, and provide this information to the merchant computer 22. If the merchant approves the transaction given the risk score, then an authorization request message may be generated and sent to the payment processing network 26. As noted above, the risk score may be generated using similar components and processes as those described with reference to FIG. 2 and step S311.

In some embodiments, although separate functional blocks are shown for an issuer computer 28, payment processing network 26, and acquirer computer 24, some entities may perform some or all of these functions and may be included in some embodiments. Further, although the methods described above show stages or steps in a particular order, embodiments may include some, all, or none of the recited steps in any combination without departing from the scope of the embodiments envisioned herein.

Though the above methods are described using the exemplary situation of a user conducting an online transaction from a home computer, embodiments of these methods are also applicable to other transactional situations. For example, a user may enter a merchant location. The user can establish a first channel of communication through the mobile phone to the payment processing network and can receive a dynamic verification value that is returned and displayed on the mobile phone. When the user provides the card number, expiration, etc. to a merchant, the user can additionally provide the dynamic verification value to the merchant for manual entry. When the merchant sends the authorization request, the transaction is processed in a similar method as described above.

In some embodiments, a user may decide that an online or in person transaction will be conducted at a later point in time. In such an embodiment, the user can log into a system, such as one provided through a merchant, issuer or payment processing network, and select a merchant and/or location in which a future transaction will occur. The user can then interface his or her portable device with a verification token on a home computing device. In an embodiment where the portable device is an IC chip card, the verification value generated on the IPG can be returned to and made viewable by computing device. The user can note the dynamic verification value and supply it to the merchant. In the embodiment where the user's portable device is a mobile phone, the dynamic verification value can be returned (e.g., written to) the mobile phone and stored on the mobile phone. The user can then view the verification value and provide it to the merchant. In a further embodiment, the dynamic verification value can be used for multiple transactions conducted at a time after the value is generated.

III. Exemplary Method Using Dynamic Verification Value

Described below is an exemplary embodiment of a system and method that utilizes a dynamic verification value in an authorization system. The methods and corresponding systems and apparatuses described below are for illustration purposes only, and are not limiting. The exemplary method will be described with reference to FIG. 4.

At step S401, a user 30 conducting a transaction requests a dynamic verification value (e.g. dCVV2 or similar information that may be used to validate a transaction) from the payment processing network 26. The request may be made via a portable device 32 such as a credit card or Visa payWave card which interacts with a verification token 34 (e.g., a USB stick or embedded module) that is associated with the client computer 36. The portable device 32 may include a chip comprising chip-card type data such as a dynamic counter, dynamic verification value, PAN, cryptogram, etc. The verification token 34 allows the client computer 36 to form a secure communications channel 38 with the IPG 27. As noted above, the verification token 34 may also include a contactless reader to read data from the chip in the portable device 32. In some embodiments, the request for the dynamic verification value (dCCV2 or similar information that may be used to verify a transaction) may be made through the user's client computer 36 (e.g. via webpage interface) or mobile phone (e.g. via SMS text message or e-mail). In some embodiments, prior to sending the request, the user 30 may set up an account with the payment processing network 26. That is, for instance, a user 30 may establish an association between a verification token 34 and a portable device 32 prior to requesting a dynamic verification value. In this manner, the payment processing network 26 may anticipate receiving the request from the user 30 and can appropriately process the request. In some embodiments, the user 30 may, in addition to or in lieu of requesting a dCW2, make a request for a PAN, dPAN, cryptogram, counter or the like to the payment processing network 26.

At step S402, the client computer 36 or verification token 34 communicates with the IPG 27 via a secure channel. The secure channel, as described above, may be established in any suitable manner, including an encrypted SSL session. The client computer 36 or verification token 34 may send to the IPG 27 information associated with the verification token 34 (e.g. the verification token serial number), an encrypted message (e.g. using a unique encryption key), and/or information related to the portable device (e.g. account number, verification values, user information, etc.). In some embodiments, the verification token may send any information (whether encrypted or otherwise) that may be used to validate the verification token, as was described above.

At step S403, the verification token 34 and/or portable device 32 are validated utilizing the information received in step S402. This can be done in any suitable manner, including those described in detail above. In some embodiments, the validation may involve the IPG 27 communicating with the payment processing network 26. That is, in some embodiments, the payment processing network 26 may comprise information that is used to validate the verification token 34. This could, for example and as described in detail above, comprise a database of verification token serial numbers and corresponding encryption keys, IP addresses, information related to client computer 36, etc. In addition, when the client computer 36 is connected to the IPG 27 and the payment processing network 26, a number of different processes can be performed. For example, in one embodiment, the payment processing network 26 may receive data from the portable device 32 such as PANs, cryptograms, counters, dynamic verification values, etc. This information may be stored in the payment processing network 26 for use in generating a risk score associated with a later transaction and/or validating a verification token in a future request from the user 30.

At step S404, in some embodiments if the verification token is validated, the user 30 (via the verification token 34) or the user's client computer 36 can receive a message from the payment processing network 26 via the secure communications channel 38 and the IPG 27 that includes a dynamic verification value (e.g. dCVV2 and/or similar information that may be used in a subsequent transaction by the user 30). In some embodiments, the message may be sent back through the same channel that the request was sent in, or a different channel, such as an email, text message, or through a web interface. In some embodiments, the information may be stored in the verification token 34 and the user 30 may not have access to this information. In such embodiments, the verification token 34 may be used to submit information to perform a transaction, as was described above. The dynamic verification information may also be sent to the payment processing network 26 and/or an authorization system 25. In some embodiments, the authorization system 25 is located at the payment processing network 26. In some embodiments, where a merchant processor 23 is used, the dynamic verification value may be sent to the merchant processor.

At step S405, the user 30 conducts a transaction with a merchant and provides the received dynamic verification value (e.g. the dCVV2 value) received in step S404. In some embodiments, the user 30 uses a portable device 32 such as a Visa payWave card to interact with the verification token 34 that is associated with the client computer 36 to conduct the transaction at a merchant's website. The user 30 may enter the dynamic verification value on the checkout page of the merchant's website when conducting the transaction. In some embodiments, the verification token 34 automatically enters the dynamic verification value on the checkout page. The dynamic verification value may also be provided securely by using the verification token 34 via the secure communications channel 38 and the IPG 27.

At step 406, an authorization request message corresponding to the transaction may be generated. This authorization request message may comprise transaction related information (e.g. information such as a merchant identifier, transaction amount, transaction velocity, etc.), account information (e.g. account number, expiration date, card verification value, etc.), and verification information (e.g. the dynamic verification value).

Continuing on the right side of the two paths shown in FIG. 4 corresponding to the use of an authorization system 25, at step S407 the authorization request message is then forwarded to the acquirer computer 24. After receiving the authorization request message, the acquirer computer 24 may forward the authorization request message to the payment processing network 26. In some embodiments, the authorization request message may be forwarded directly to the payment processing network 26 and or an authorization system 25.

At step S408, the data included in the authorization request message (e.g. transaction information, account information, and verification information) may be input into an authorization system 25. Examples of such systems were discussed above. As noted above, the authorization system 25 performs many different functions. For example, the authorization system 25 may information related to a transaction and generate real-time mitigation information based on collective intelligence. The real-time risk mitigation information may allow an issuer to make a more informed decision with respect to the transaction, thereby minimizing a risk associated with the transaction, as detailed with respect to steps S409 and S413 (in merchant processor embodiments).

At step S409, a risk score that is associated with the transaction is generated based at least in part on the verification value (in some embodiments, a dCW2 value). That is, the authorization system 25 may use the dynamic verification value as further criteria for determining the real-time mitigation information. For instance, a dynamic verification value received in the authorization message at step S407 may be compared to a dynamic verification value corresponding to the account number or portable device that was previously received when the verification token was validated in steps S403 and S404. If the two values match, then this may provide additional evidence that the user conducting the transaction is in possession of the portable device and thereby the transaction is less likely to be fraudulent. Whether the two dynamic verification values correspond may be considered along with the account information (such as information related to past transactions associated with an account number, IP address, verification token, etc.) and transaction information so as to generate a risk score of the transaction. In this way, whether a correct dynamic verification value was provided in the transaction is considered by the system (but is not necessarily given dispositive weight) in determining whether to authorize a transaction. Some or all of the information provided, including the past transaction information and known fraudulent entities (using IP address, account number, serial number of equipment, etc.) may be considered along with the use of the verification token (and whether it was valid) to generate the risk score.

In some embodiments, rather than sending the dynamic verification information to the authorization system 25, the payment processing network 26 may compare the dynamic verification value received in step S405 as part of the transaction with the dynamic verification value that was previously received and stored in steps S403 and S404 as part of the validation of the verification token. Whether the two values match may be conveyed to the authorization system 25, which can then use this information in combination with some or all of the other information received about the account and the transaction.

At step S410, the payment processing network 26 and/or the authorization system 25 sends the authorization request message corresponding to the transaction, which may now include real-time mitigation information (i.e. the risk score) generated by the authorization system 25, to the issuer computer 28 of the portable consumer device 32. The issuer may then use the risk score (which may also include information (e.g. reason codes) as to how the risk score was generated) to determine whether to authorize a transaction. In this manner, the issuers may choose how risk adverse they are in approving transactions. For instance and illustration purposes only, if a risk score is given on a scale of "one-to-ten," a first issuer may approve any transaction that is rated as a "5" or below in risk and a second issuer may approves transactions that are a rated as "7" or below. In this manner, the first issuer may be more risk adverse, choosing to reject more legitimate transactions so as to avoid approving fraudulent transactions, whereas the second issuer is less risk adverse and willing to risk some fraudulent transactions to approve the additional transactions with a higher risk score.

After the issuer approves or disapproves of the transaction conducted with the dynamic verification value, an authorization response message is sent by the issuer computer 28 to the merchant computer 22 and also the client computer 36 via the acquirer computer 24 and the payment processing network 26. A normal clearing and settlement process may occur at the end of the day.

An additional embodiment is also shown in FIG. 4 that utilizes a merchant processor 23 (such as the commercially available service Cybersource and similar systems) for determining whether to authorize a transaction. As shown in FIG. 4, steps S401-S406 may comprise similar steps regarding the validation of the token and the generation of the dynamic verification value. In some embodiments, instead of or in addition to sending the dynamic verification value to an authorization system 25, the dynamic verification value may be sent to a merchant processor 23. As noted above, the merchant processor 23 may perform a similar function as the authorization system 25 in assessing the risk of a transaction. In some embodiments, the merchant processor performs this functionality on the merchant side of the authorization process. That is, prior to sending the authorization message to an issuer computer 28, the transaction may be approved or disapproved by the merchant and/or merchant processor 23 based on the risk assessment.

At step S412, the authorization message associated with the first transaction may be sent to the merchant processor 23, which may include account information, transaction information, and verification information. The verification information may comprise the dynamic verification value. As noted above, the merchant processor 23 may perform some or all of the same functions as the authorization system 25, and may thereby comprise similar structure and functional components, including hardware and software modules. Merchant processor 23 may also have access to the same databases of past transaction and fraudulent information, which may be located at the merchant processor 23, at the payment processing network 26, or any other suitable location.

At step S413, the merchant processor 23 may determine a risk score associated with the transaction. This may comprise utilizing the account information, the transaction information, and/or the verification information, as was described with respect to the authorization system 25 in step S409. For instance, a dynamic verification value received in the authorization message at step S412 may be compared to a dynamic verification value corresponding to the account number or portable device that was previously received when the verification token was validated in steps S403 and S404. If the two values match, then this may provide additional evidence that the user conducting the transaction is in possession of the portable device and thereby the transaction is less likely to be fraudulent. Whether the two dynamic verification values correspond may be considered along with the account information (such as information related to past transactions associated with an account number, IP address, verification token, etc.) and transaction information so as to generate a risk score of the transaction. In this way, whether a correct dynamic verification value was provided in the transaction is considered by the system (but is not necessarily given dispositive weight) in determining whether to authorize a transaction. Some or all of the information provided, including the past transaction information and known fraudulent entities (using IP address, account number, serial number of equipment, etc.) may be considered along with the use of the verification token (and whether it was valid) to generate the risk score.

In some embodiments, rather than sending the dynamic verification information to the authorization system 25, the merchant processor may only receive an indication as to whether there was a correspondence between the two values. The merchant processor may use this verification information along with any other information to determine a risk associated with a transaction.

In embodiments in which a merchant processor 23 is used, at step S411 a determination as to whether to approve the transaction is made. This may be done by the merchant processor 23 based on the information received and/or the determined risk associated with the transaction. In some embodiments, the merchant processor 23 may send a risk score to the merchant computer 22, and the merchant may then determine whether to approve the transaction based on the generated risk score. In this manner, whether the verification token was validated for a portable device or account is utilized as a factor in determining the risk associated with a transaction.

After the merchant or merchant processor 23 approves or disapproves of the transaction conducted with the dynamic verification value, an authorization response message may be sent to the client computer 36. Moreover, in some embodiments, after the merchant approves the transaction, a similar method as that described in steps S407-S411 may then be performed to receive approval from the issuer (and thereby both the issuer and the merchant will have approved the transaction). In some embodiments, after the merchant and/or merchant processor 23 approve the transaction, an authorization request message is sent to the payment processing network 26 via the acquirer, and the normal authorization process is followed. A normal clearing and settlement process may occur at the end of the day.

Embodiments of the invention may provide a number of advantages. For example, in some embodiments of the invention, the additional information considered by the authorization system 25 in the form of verification information allows for an enhanced authorization technique to prevent fraudulent transactions. That is, in traditional authorization systems, there is often relatively little information that may be used for determining the risk associated with a transaction, particularly in ecommerce environments where a portable device is not typically be presented. The use of a verification token 34, and the information corresponding to whether it has been validated, may provide additional information that may be considered in generating a risk score for a transaction.

In addition, embodiments utilizing the verification information as an input into an authorization system (i.e. as one factor of potentially many other considerations), may provide the possibility that a fraudulent transaction may be detected even if a verification token is compromised. For instance, if a portable device was stolen and then used in a transaction involving a verification token (i.e. the stolen portable device interacts with a valid verification token), the other factors associated with the transaction (such as whether the account was used in the a previous fraudulent transaction, the amount of the transaction, the velocity of transactions, etc.) may still alert the authorizing entity to the fraud (e.g. by increasing the risk score associated with the transaction). As a further example, if a verification token malfunctions, or another error occurs such that an otherwise valid token is not validated, a legitimate transaction may still be approved because the verification information related to the validation of the token may be only one of plurality of factors considered in generating the risk score. Thus, unlike systems whereby, for instance, a dynamic verification value must correspond precisely with a previously supplied value (or a password must be entered correctly for the transaction to be approved), embodiments may provide a more robust and flexible authorization system, that utilizes additional information that may be used to determine whether a transaction is fraudulent.

III. Exemplary Portable Devices, Access Devices, and Computer Apparatuses

Referring now to FIG. 7 the various participants and elements in FIGS. 1 and 2 can operate one or more computer apparatuses (e.g., a server computer) to facilitate the functions described herein. Any of the elements in FIGS. 1 and 2 can use any suitable number of subsystems to facilitate the functions described herein. Examples of such subsystems or components are shown in FIG. 7. The subsystems shown in FIG. 7 are interconnected via a system bus 710. Additional subsystems such as a printer 703, keyboard 706, fixed disk 707 (or other memory comprising computer readable media), monitor 709, which is coupled to display adapter 704, and others are shown. Peripherals and input/output (I/O) devices, which coupled to I/O controller 700, can be connected to the computer system by any number of means known in the art, such as serial port 705. For example, serial port 705 or external interface 708 can be used to connect the computer apparatus to a wide area network such as the Internet, a mouse input device, or a scanner. The interconnection via system bus allows the central processor 702 to communicate with each subsystem and to control the execution of instructions from system memory 701 or the fixed disk 707, as well as the exchange of information between subsystems. The system memory 701 and/or the fixed disk 707 can embody a computer readable medium.

Figure 8A:
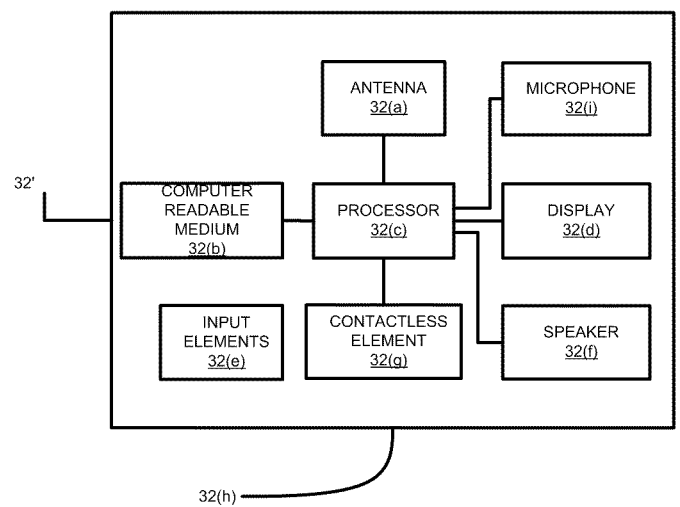
FIG. 8(a) shows a block diagram of functional components present in a mobile phone.

FIGS. 8(*a*) and 8(*b*) show examples of portable devices.

FIG. 8(*a*) shows a block diagram of a phone 32' that can be used in embodiments of the invention. The phone can be both a notification device that can receive alert messages, as well as a portable device that can be used to make payments. The exemplary wireless phone 32' may comprise a computer readable medium and a body as shown in FIG. 3(*a*). The computer readable medium 32(*b*) may be present within the body 32(*h*), or may be detachable from it. The body 32(*h*) may be in the form a plastic substrate, housing, or other structure. The computer readable medium 32(*b*) may be in the form of (or may be included in) a memory that stores data (e.g., issuer account numbers, loyalty provider account numbers, etc.) and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, loyalty account information (e.g., a loyalty account number), a bank identification number (BIN), credit or debit card number information, account balance information, expiration date, consumer information such as name, date of birth, etc. Any of this information may be transmitted by the phone 32'.

In some embodiments, information in the memory may also be in the form of data tracks that are traditionally associated with credit cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks abide by it. It contains the cardholder's account, encrypted PIN, plus other discretionary data.

The phone 32' may further include a contactless element 32(*g*), which is typically implemented in the form of a semiconductor chip (or other data storage element) with an associated wireless transfer (e.g., data transmission) element, such as an antenna. Contactless element 32(*g*) is associated with (e.g., embedded within) phone 32' and data or control instructions transmitted via a cellular network may be applied to contactless element 32(*g*) by means of a contactless element interface (not shown). The contactless element interface functions to permit the exchange of data and/or control instructions between the mobile device circuitry (and hence the cellular network) and an optional contactless element 32(*g*).

Contactless element 32(*g*) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 32' and an interrogation device. Thus, the phone 32' is capable of communicating and transferring data and/or control instructions via both cellular network and near field communications capability.

The phone 32' may also include a processor 32(*c*) (e.g., a microprocessor) for processing the functions of the phone 32 and a display 32(*d*) to allow a consumer to see phone numbers and other information and messages. The phone 32' may further include input elements 32(*e*) to allow a user to input information into the device, a speaker 32(*f*) to allow the user to hear voice communication, music, etc., and a microphone 32(*i*) to allow the user to transmit her voice through the phone 32'. The phone 32' may also include an antenna 32(*a*) for wireless data transfer (e.g., data transmission).

If the portable device is in the form of a debit, credit, or smartcard, the portable device may also optionally have features such as magnetic stripes. Such devices can operate in either a contact or contactless mode.

Figure 8B:
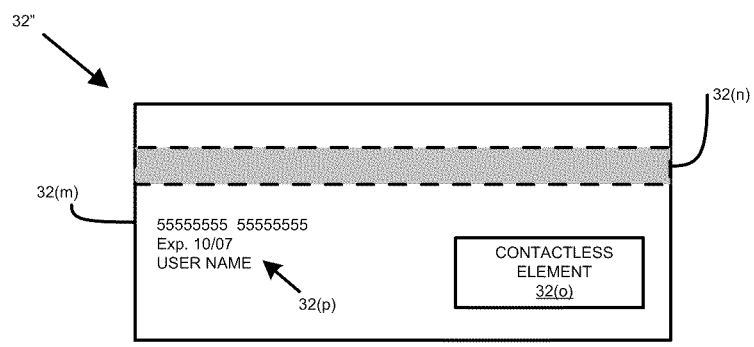
FIG. 8(b) shows a schematic depiction of a payment card.

An example of a portable device 32" in the form of a card is shown in FIG. 8(b). FIG. 8(b) shows a plastic substrate 32(m). A contactless element 32(o) for interfacing with an access device 34 may be present on or embedded within the plastic substrate 32(m). Consumer information 32(p) such as an account number, expiration date, and user name may be printed or embossed on the card. Also, a magnetic stripe 32(n) may also be on the plastic substrate 32(m). The portable device 32" may also comprise a microprocessor and/or memory chips with user data stored in them.

As shown in FIG. 8(b), the portable device 32" may include both a magnetic stripe 32(n) and a contactless element 32(o). In other embodiments, both the magnetic stripe 32(n) and the contactless element 32(o) may be in the portable device 32". In other embodiments, either the magnetic stripe 32(n) or the contactless element 32(o) may be present in the portable device 32".

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment can be combined with one or more features of any other embodiment without departing from the scope of the invention.

A recitation of "a", "an" or "the" is intended to mean "one or more" unless specifically indicated to the contrary

What is claimed is:

1. A server computer comprising:
   a processor; and
   a non-transitory computer readable medium coupled to the processor, wherein the non-transitory computer readable medium comprises code executable by the processor for implementing a method comprising:
   receiving verification information, wherein the verification information is based on a verification token associated with a client computer;
   receiving transaction information associated with a first transaction;
   receiving account information associated with a payment account used in the first transaction; and
   generating a risk score associated with the first transaction based on at least the verification information, the transaction information, and the account information,
   wherein the verification information is based on an interaction between the verification token and a portable device associated with the first transaction, and the verification information comprises information indicating whether the verification token and/or account information is valid.

2. The server computer of claim 1, wherein the interaction between the verification token and the portable device comprises short range communication.

3. The server computer of claim 1, wherein receiving the verification information further comprises:
   receiving a first dynamic verification value corresponding to the portable device; and
   receiving a second dynamic verification value associated with the first transaction.

4. The server computer of claim 1, wherein receiving the verification information further comprises:
   instead of receiving actual values of a first dynamic verification value corresponding to the portable device and a second dynamic verification value associated with the first transaction, receiving an indication of whether the first dynamic verification value matches the second dynamic verification value.

5. A method comprising:
   receiving, by a server computer, verification information, wherein the verification information is based on a verification token associated with a client computer;
   receiving transaction information associated with a first transaction;
   receiving account information associated with a payment account used in the first transaction; and
   generating a risk score associated with the first transaction based on at least the verification information, the transaction information, and the account information,
   wherein the verification information is based on an interaction between the verification token and a portable device associated with the first transaction, and the verification information comprises information indicating whether the verification token and/or account information is valid.

6. The method of claim 5, wherein the interaction between the verification token and the portable device comprises short range communication.

7. The method of claim 5, wherein receiving the verification information further comprises:
   receiving a first dynamic verification value corresponding to the portable device; and
   receiving a second dynamic verification value associated with the first transaction.

8. The method of claim 5, wherein receiving the verification information further comprises:
   instead of receiving actual values of a first dynamic verification value corresponding to the portable device and a second dynamic verification value associated with the first transaction, receiving an indication of whether the first dynamic verification value matches the second dynamic verification value.

9. A client computer comprising:
   a processor; and
   a non-transitory computer readable medium coupled to the processor, wherein the non-transitory computer readable medium comprises code executable by the processor for implementing a method comprising:
   receiving account information stored on a portable device based on an interaction between the portable device and a verification token;
   sending the account information to a server computer; and
   sending information associated with the verification token to the server computer, wherein the information associated with the verification token is used by the server computer to validate the verification token, and wherein a risk score is generated corresponding to a first transaction based at least in part on the validation of the verification token;
   receiving verification information from the server computer, wherein the verification information is generated by the server computer based on the validation of the verification token; and
   sending the verification information to a merchant associated with the first transaction, wherein the verification information is used to generate the risk score corresponding to the first transaction.

10. The client computer of claim 9, wherein the information associated with the verification token comprises at least one of: a serial number of the verification token and an IP address associated with the client computer or the verification token.

11. The client computer of claim 9, wherein the method further comprises:
   establishing a secure communication channel with the server computer based at least in part on the information associated with the verification token.

12. The client computer of claim 9, wherein the verification information comprises a dynamic verification value.

13. The client computer of claim 9, wherein the verification token utilizes the account information from the portable device to complete an order form on a merchant webpage.

14. A method comprising:
   receiving account information from a portable device based on an interaction between the portable device and a verification token;
   sending the account information to a server computer; and
   sending information associated with the verification token to the server computer, wherein the information associated with the verification token is used by the server computer to validate the verification token, and wherein a risk score is generated corresponding to a first transaction based at least in part on the validation of the verification token;
   receiving verification information from the server computer, wherein the verification information is generated by the server computer based on the validation of the verification token; and
   sending the verification information to a merchant associated with the first transaction, wherein the verification information is used to generate the risk score corresponding to the first transaction.

15. The method of claim 14, wherein the information associated with the verification token comprises at least one of: a serial number of the verification token and an IP address associated with the client computer or the verification token.

16. The method of claim 14, wherein the method further comprises:
   establishing a secure communication channel with the server computer based at least in part on the information associated with the verification token.

17. The method of claim 14, wherein the verification information comprises a dynamic verification value.

18. The method of claim 14, wherein the verification token utilizes the account information from the portable device to complete an order form on a merchant webpage.

* * * * *